United States Patent
Benemann et al.

(10) Patent No.: US 10,582,137 B1
(45) Date of Patent: Mar. 3, 2020

(54) MULTI-SENSOR DATA CAPTURE SYNCHRONIZAITON

(71) Applicant: Zoox, Inc., Foster City, CA (US)

(72) Inventors: Arthur Benemann, San Carlos, CA (US); Christopher Allen Johnson, Gilroy, CA (US); Turhan Karadeniz, Oakland, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/142,966

(22) Filed: Sep. 26, 2018

(51) Int. Cl.
| | |
|---|---|
| *H04N 5/353* | (2011.01) |
| *G01S 17/02* | (2006.01) |
| *G01S 17/93* | (2006.01) |
| *G05D 1/02* | (2020.01) |
| *G01S 17/86* | (2020.01) |
| *G01S 17/931* | (2020.01) |

(52) U.S. Cl.
CPC ........... *H04N 5/3532* (2013.01); *G01S 17/86* (2020.01); *G01S 17/931* (2020.01); *G05D 1/0231* (2013.01); *G05D 1/0255* (2013.01); *G05D 1/0257* (2013.01); *G05D 1/0278* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 6,141,043 A | 10/2000 | Suzuki et al. | |
| 10,176,596 B1* | 1/2019 | Mou | G06T 7/80 |
| 2007/0140592 A1* | 6/2007 | Toyoda | H04N 5/2353 |
| | | | 382/294 |
| 2012/0081567 A1 | 4/2012 | Cote et al. | |
| 2012/0091567 A1 | 4/2012 | Pagaila et al. | |
| 2014/0198184 A1* | 7/2014 | Stein | G06K 9/00791 |
| | | | 348/47 |
| 2015/0062013 A1* | 3/2015 | Solomon | G06F 3/0304 |
| | | | 345/158 |
| 2015/0237267 A1 | 8/2015 | Han et al. | |
| 2017/0148169 A1 | 5/2017 | Kyung | |
| 2017/0187961 A1 | 6/2017 | Katz et al. | |
| 2017/0242442 A1* | 8/2017 | Minster | G05D 1/0248 |
| 2017/0289646 A1 | 10/2017 | Kanthapanit et al. | |

(Continued)

FOREIGN PATENT DOCUMENTS

EP     2261604 a1     12/2010

OTHER PUBLICATIONS

Office action for U.S. Appl. No. 16/142,865 dated Jun. 28, 2019, Benemann, "Image Scan Line Timestamping," 13 pages.

(Continued)

*Primary Examiner* — Fernando Alcon
(74) *Attorney, Agent, or Firm* — Lee & Hayes, P.C.

(57) ABSTRACT

Techniques are disclosed for adding time data to scan lines of an image frame. In some examples, an image sensor may perform a rolling shutter image capture to produce the scan lines. Data captured by another sensor may be associated with at least a portion of a scan line based at least in part on the time data added to the scan line in some examples. Furthermore, techniques are disclosed for synchronizing data capture by multiple sensors. For example, a rolling shutter image capture performed by an image sensor may be synchronized with a data capture performed by another sensor.

20 Claims, 11 Drawing Sheets

(56) References Cited

U.S. PATENT DOCUMENTS

| | | | | |
|---|---|---|---|---|
| 2017/0364758 A1* | 12/2017 | Minster | ............. | G06K 9/00201 |
| 2018/0164827 A1* | 6/2018 | Chu | .................. | G01C 21/3415 |
| 2018/0212684 A1 | 7/2018 | Aoyama et al. | | |
| 2018/0307238 A1* | 10/2018 | Wisniowski | ......... | G05D 1/0246 |
| 2019/0007142 A1 | 1/2019 | Kido et al. | | |
| 2019/0120948 A1* | 4/2019 | Yang | ....................... | G01S 17/87 |

OTHER PUBLICATIONS

Office action for U.S. Appl. No. 16/142,865 dated Nov. 25, 2019, Benemann, "Image Scan Line Timestamping", 22 pages.

The PCT Invitation to Pay Additional Fees dated Jan. 3, 2020, for PCT Application No. PCT/US2019/053023, 15 pages.

\* cited by examiner

MULTI-SENSOR DATA CAPTURE SYNCHRONIZAITON

BACKGROUND

Various methods, apparatuses, and systems utilize image data from image sensors. For example, robotic platforms (e.g., autonomous vehicles) may use image data and/or other sensor data to navigate through environments including obstacles, such as other vehicles, buildings, pedestrians, etc. In some examples, time information (e.g., a timestamp) may be associated with an image frame as a whole, which can present various challenges, such as inaccurately associating the capture of a particular portion of the image frame with a particular portion of data from another sensor due to temporal differences between capture of the particular portion of the image frame and the particular portion of data from the other sensor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
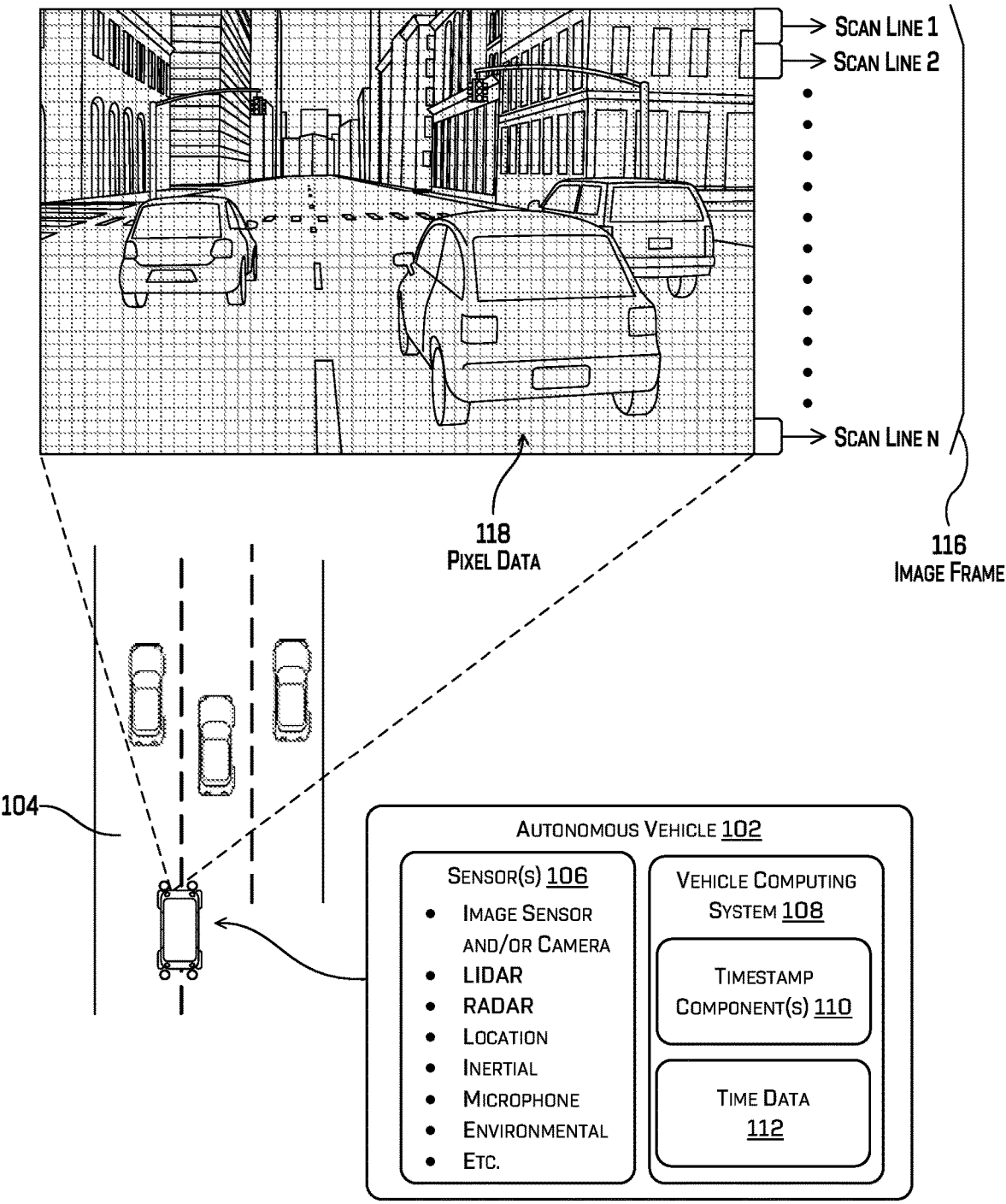
FIG. 1 illustrates an example environment that includes a vehicle having one or more timestamp components for adding time data to scan lines of an image frame (e.g., of a rolling shutter image capture), in accordance with examples of the disclosure.

In some systems, time information (e.g., a timestamp) may be associated with an image frame as a whole. Such time information may limit the systems' ability to accurately associate the capture of a particular portion of the image frame with a particular portion of data from another sensor, e.g., due to temporal differences between capture of the particular portion of the image frame and the particular portion of data from the other sensor. Further, in some examples, because a single timestamp is associated with an image as a whole, additional processes are inaccurate, or otherwise infeasible, to perform (e.g., camera calibration, 3D reconstruction, tracking, feature extraction, and the like). This disclosure is directed to techniques for adding time data to portions of an image at capture (e.g., scan lines of an image frame during a rolling shutter image capture). Furthermore, this disclosure is directed to techniques for synchronizing data capture by multiple sensors. Among other things, the techniques discussed herein may enable accurate alignment of a particular portion of the image frame with a particular portion of data from another sensor (e.g., another sensor modality, such as LIDAR, and/or other image-based sensor systems).

In some examples, an image sensor of a vehicle (e.g., an autonomous vehicle) may capture an image of a scene within a first field of view of the image sensor. In some examples, the image capture may be performed by scanning across the scene (e.g., vertically or horizontally) to capture a portion of the scene (e.g., a first scan line) before capturing another portion of the scene (e.g., a second scan line), and so on, such as in a rolling shutter image capture. The rolling shutter image capture may produce scan lines of an image frame. A scan line may include scan line data (e.g., pixel data) and end of line data. The end of line data may indicate an end of the scan line.

In various examples, a computing system of the vehicle may receive the scan lines and add respective time data (e.g., timestamps) to one or more of the scan lines. For example, the computing system may add time data to each of the scan lines. In some examples, time data may be added to a scan line such that the time data is between the scan line data and the end of line data. According to some examples, the end of line data associated with the scan line may be shifted from a first position to a second position, e.g., to accommodate the addition of the time data.

In some examples, a LIDAR sensor of the vehicle may capture LIDAR data (e.g., LIDAR points) within a second field of view of the LIDAR sensor which may at least partially overlap with the first field of view of the image sensor. According to some implementations, the computing system may associate at least a portion of the LIDAR data with at least a portion of a scan line based at least in part on the time data added to the scan line (and/or based at least in part on time data associate with the portion of the LIDAR data) and a timestamp associated with the collection of LIDAR data. Furthermore, the computing system may associate (e.g., fuse) image data with LIDAR data based at least in part on the association of the portion of the LIDAR data with the portion of the scan line, producing associated data. The associated data may be used as an input for controlling movement of the vehicle in some examples.

In some implementations, the computing system may use the time data added to one or more scan lines to modify a distorted image to produce a corrected image. For example, the distorted image may include one or more distortion effects caused by motion associated with a rolling shutter image capture. As non-limiting examples, the distortion effect(s) may include wobble, skew, spatial aliasing, and/or temporal aliasing, etc. Modifying the distorted image may include correcting or compensating for the distortion effect(s).

According to some examples, the second field of view associated with the LIDAR sensor may be movable relative to the first field of view associated with the image sensor. In some examples, the second field of view may be rotatable (e.g., about one or more axes).

In some examples, the computing system may synchronize image data capture (by the image sensor) with LIDAR data capture (by the LIDAR sensor). For example, the computing system may trigger the image sensor to perform a rolling shutter image capture of a scene during a time period in which the LIDAR sensor is capturing LIDAR data of at least a portion of the scene corresponding to a field of view of the image sensor. In various examples, the computing system may implement the synchronization in accordance with one or more synchronization condition(s). As non-limiting examples, the synchronization condition(s) may include an amount of overlap between the first field of view (associated with the image sensor) and the second field of view (associated with the LIDAR sensor), and/or an overlap between a first particular portion of the first field of view and a second particular portion of the second field of view, etc. As a non-limiting example, capturing of image data may be triggered such that the center of the image is captured substantially simultaneously with a spinning LIDAR sensor aligning with a field of view of the image sensor.

In some examples, the computing system may determine a first orientation of the first field of view and/or a first pose (position and orientation) associated with the image sensor. Furthermore, the computing system may determine a second orientation of the second field of view and/or a second pose associated with the LIDAR sensor. In some examples, the respective orientations and/or the respective poses associated with the image sensor and/or the LIDAR sensor may be tracked. According to some examples, the orientations and/or the poses may be tracked relative to one another. The computing system may use field of view orientation information and/or pose information as an input for causing the image sensor to initiate the rolling shutter image capture of the first field of view, e.g., such that at least a first portion of the first field of view (associated with the image sensor) overlaps at least a second portion of the second field of view (associated with the LIDAR sensor) in accordance with the synchronization condition(s). In at least some examples, such initialization may be timed so as to optimize (e.g., maximize) an overlap of the respective fields of view. In various examples, the second field of view associated with the LIDAR sensor may move relative to the first field of view associated with the image sensor during the rolling shutter image capture. As a non-limiting example, a spinning LIDAR sensor may be associated with a field of view that moves relative to a field of view associated with the image sensor.

The techniques discussed herein can improve a functioning of a computing device in a number of ways. For example, the techniques discussed herein may include adding time data to individual scan lines of an image frame, which may allow a computing device to accurately align (or otherwise associate) pixels of the image frame with LIDAR points, e.g., to achieve accurate multi-modal sensor fusion, sensor calibration, 3D reconstruction, multi-modal calibration, and the like. The computing system of the vehicle, for example, may generate a more accurate representation of the environment of the vehicle by making such associations using time data associated with individual scan lines as compared to using time data associated with an image frame as a whole. Consequently, the computing system of the vehicle may be able to improve its detection of objects (e.g., obstacles) and its trajectory and/or route planning, e.g., to control movement of the vehicle to avoid colliding with obstacles.

As another example, by synchronizing sensor data capture using the techniques described herein, the computing system of the vehicle may be able to accurately associate (e.g., temporally and/or spatially) image data with LIDAR data. In some implementations, the synchronization may allow for determining that data captured by the image sensor and the LIDAR sensor are associated with one another when the data is received, which may reduce the amount of processing required for determining associations between the data after the data is received by the computing system of the vehicle. These and other improvements to the functioning of the computing system are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform, manually driven vehicles, etc.), and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two.

FIG. 1 illustrates an example environment 100 that includes a vehicle 102 having one or more timestamp components for adding time data to scan lines of an image frame (e.g., of a rolling shutter image capture), in accordance with examples of the disclosure. In some examples, the environment 100 may include one or multiple features, components, and/or functionality of examples described herein with reference to FIGS. 2-11.

In some examples, the vehicle 102 may be configured to travel across a surface 104 (e.g., a road surface), for example, to transport people and/or cargo from a first location to a second location. For the purpose of illustration, the vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assistance during certain driving conditions, such as, for example, while operating on limited-access highways, but such that they require driver attention and/or assistance during other driving conditions, such as, for example, while operating on city streets in urban areas, or during at least some parking functions.

In some examples, the vehicle 102 may be an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, or any combination thereof. In addition, although the example vehicle 102 may have four wheels, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end of the vehicle 102 may be in the front end of the vehicle 102 when traveling in a first direction, and such that the first end may become the rear end of the vehicle 102 when traveling in an opposite, second direction. Similarly, a second end of the vehicle 102 may be the front end of the vehicle 102 when traveling in the second direction, and the second end may become the rear end of the vehicle 102 when traveling in the opposite, first direction. These example characteristics may facilitate greater maneuverability, for example, in small spaces or crowded environments, such as parking lots and urban areas.

According to various examples, the vehicle 102 may include sensors 106. Furthermore, in various examples, the vehicle 102 may include a vehicle computing system 108. The vehicle computing system 108 may include one or more components that cause the vehicle computing system 108 and/or the vehicle 102 to perform various operations. In various examples, the vehicle computing system 108 may include timestamp component(s) 110 and/or time data 112. As will be discussed in further detail herein, the vehicle computing system 108 may use the timestamp component(s) 110 to add time data 112 to one or more scan lines of an image frame.

Figure 2:
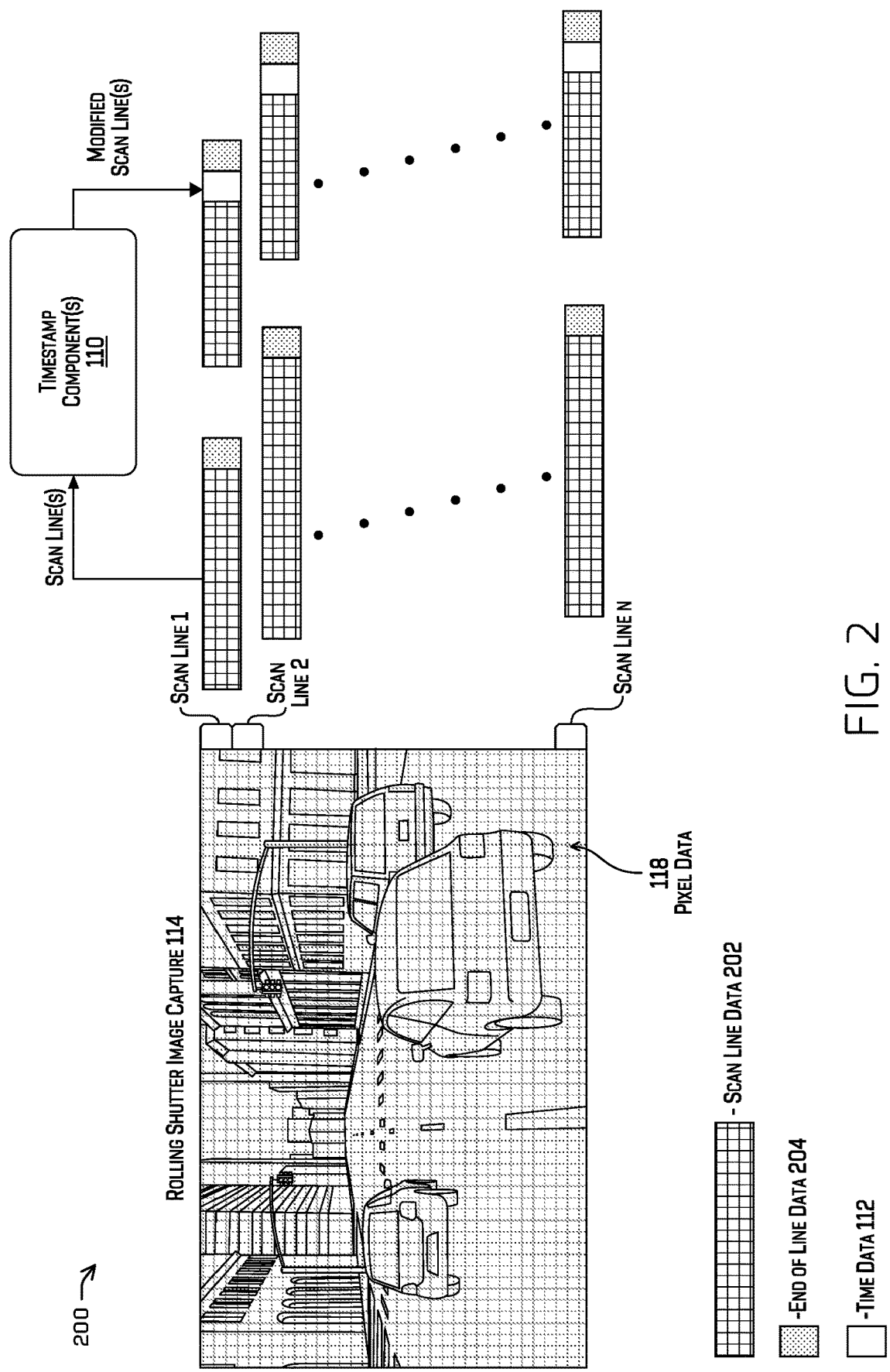
FIG. 2 is a schematic diagram illustrating an example of time data being added (e.g., via timestamp component(s)) to scan lines of an image frame, in accordance with examples of the disclosure.

According to some implementations, a sensor 106 (e.g., an image sensor such as a rolling shutter image capture device) of the vehicle 102 may capture an image of a scene within a field of view associated with the sensor 106. In some examples, the image capture may be performed by scanning across the scene (e.g., vertically or horizontally) to capture a portion of the scene (e.g., a first scan line) before capturing another portion of the scene (e.g., a second scan line), such as in a rolling shutter image capture. FIG. 1 includes an example representation of a rolling shutter image capture 114 of a scene that is within a field of view of a sensor 106 of the vehicle 102. As indicated in this non-limiting example, the rolling shutter image capture 114 may be performed by horizontally scanning across the scene. The rolling shutter image capture may produce scan lines (e.g., scan line 1, scan line 2, . . . scan line n) of an image frame 116. The scan lines may include scan line data (e.g., pixel data 118). Furthermore, in some examples, the scan lines may be associated with, and/or may include, end of line data (e.g., as indicated in FIG. 2). In some cases, end of line data associated with a particular scan line may indicate an end of that scan line. In various examples, the vehicle computing system 108 may use the timestamp component(s) 110 to add time data 112 to one or more scan lines, e.g., as discussed herein with reference to FIGS. 2-4 and 7-9. In some non-limiting examples, the timestamp component(s) 110 may function to add time data 112 to each scan line of the image frame 116.

In some examples, the sensor(s) 106 may include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor(s) 106 can generate sensor data, which can be utilized by vehicle computing system 108 associated with the vehicle 102.

FIG. 2 is a schematic diagram illustrating an example 200 of time data being added (e.g., via timestamp component(s) 110) to scan lines of an image frame, in accordance with examples of the disclosure. In some examples, the example 200 may include one or multiple features, components, and/or functionality of examples described herein with reference to FIGS. 1 and 3-11.

In some examples, scan lines (e.g., scan line 1, scan line 2, . . . scan line n) of an image frame (e.g., image frame 116 described above with reference to FIG. 1) may be produced by a rolling shutter image capture 114. For example, the rolling shutter image capture 114 may be performed by an image sensor (e.g., an image sensor 106 of the vehicle 102 described above with reference to FIG. 1).

As indicated in FIG. 2, a scan line may include, and/or be associated with, scan line data 202 (e.g., including pixel data 118) and/or end of line data 204 (e.g., a signal that indicates an end of the scan line). For example, scan line 1 may include first scan line data and first end of line data, scan line 2 may include second scan line data and second end of line data, etc. While FIG. 2 illustrates scan line data 202 and end of line data 204 as different components of a scan line, in various examples the end of line data 204 may be considered part of the scan line data 202.

According to some examples, the timestamp component(s) 110 may receive, as input, one or more scan lines. Furthermore, the timestamp component(s) 110 may add time data 112 (e.g., timestamps) to the scan line(s), and output modified scan line(s) that include time data 112, as indicated in FIG. 2. For example, the timestamp component(s) 110 may add first time data to scan line 1, second time data to scan line 2, etc. The first time data may be different than the second time data. For example, the first time data may be a first timestamp or otherwise indicate a first time (and/or first time period) at which scan line 1 was produced and/or received (e.g., by the timestamp component(s) 110). The second time data may be a second timestamp or otherwise indicate a second time (and/or second time period) at which scan line 2 was produced and/or received. In some cases, the timestamp component(s) 110 may add time data 112 to each scan line of an image frame. According to various examples, the timestamp component(s) 110 may add time data 112 to a scan line, such that the time data 112 is between the scan line data 202 and the end of line data 204 associated with the scan line. In some implementations, the end of line data 204 may be shifted, e.g., to accommodate the time data 112. For example, the end of line data 204 may be in a first position in (or relative to) the scan line prior to the time data 112 being added. The timestamp component(s) 110 may shift the end of line data 204 from the first position to a second position. In the second position, the time data 112 may be between the scan line data 202 and the end of line data 204. Furthermore, in the second position, the end of line data 204 may be disposed at an end portion of the scan line and/or otherwise indicate an end of the scan line.

In some examples, though described as additional data appended to the end of each scan line, such end of line data 204 may not be stored at the end of each line. As a non-limiting example of such, a "width" may be associated with an amount of data for each scan line. Such a width may be available in, for example, a header of the image frame. In such examples, though described as appending end of line data 204 to the end of each scan line, it is understood that no data may be written and, instead, the associated width may be increased so as to account for additional data of the associated time data.

In some examples, each scan line of the image frame may have a same exposure time. In other examples, one or more scan lines of the image frame may have a different exposure time than one or more other scan lines of the image frame. For example, scan line 1 may have a first exposure time, and scan line 2 may have a second exposure time that is different than the first exposure time.

Figure 3:
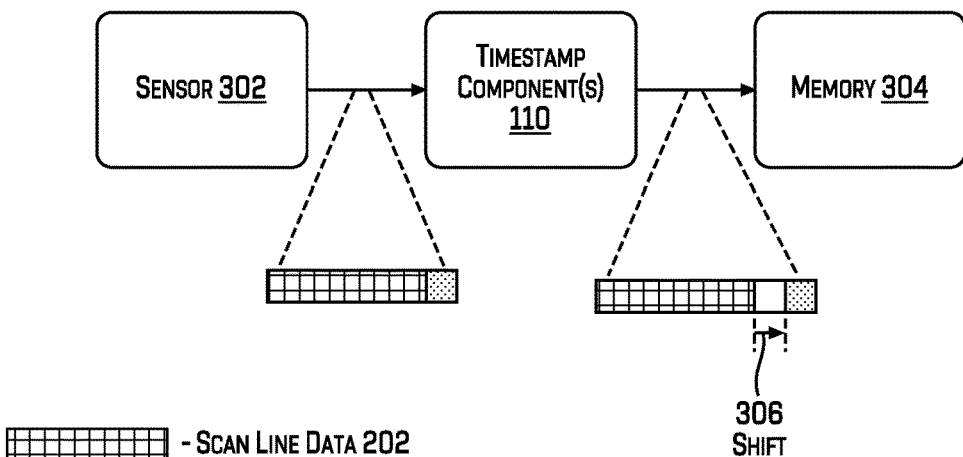
FIG. 3 is a block diagram illustrating example components for implementing an example process flow that includes adding time data to a scan line and delaying and/or shifting end of line data associated with the scan line, in accordance with examples of the disclosure.

FIG. 3 is a block diagram illustrating example components 300 for implementing an example process flow that includes adding time data to a scan line and shifting end of line data associated with the scan line, in accordance with examples of the disclosure. In some examples, the components 300 may include one or multiple features, components, and/or functionality of examples described herein with reference to FIGS. 1, 2, and 4-11.

According to some examples, the components 300 may include the timestamp component(s) 110, a sensor 302 (e.g., an image sensor), and/or a memory 304. In some examples, the timestamp component(s) 110 may receive scan lines from the sensor 302. In a non-limiting example, the timestamp component(s) 110 may receive a stream or sequence of scan lines from the sensor 302 via one or more interfaces (e.g., a Mobile Industry Processor Interface (MIPI)) and/or one or more other components configured to transmit data (e.g., image data, scan lines, etc.) between the sensor 302 and the timestamp component(s) 110.

The timestamp component(s) 110 may add time data 112 to individual scan lines, e.g., as discussed herein with reference to FIG. 2. In some examples, adding the time data 112 to a scan line may include appending the time data 112 to the scan line data 202 of the scan line. Furthermore, the timestamp component(s) 110 may shift 306 the end of line data 204 associated with the scan line from a first position to a second position, e.g., as discussed herein with reference to FIG. 2. In some examples, shifting the end of line data 204 may include appending the end of line data 204 to the time data 112. According to various examples, timestamp component(s) 110 may output modified scan lines that include time data 112, e.g., as indicated in FIG. 3. In some non-limiting examples, the modified scan lines may be transmitted to the memory 304, e.g., via direct memory access (DMA).

In various examples, there may be a delay between each scan line received (e.g., by the timestamp component(s) 110) from the sensor 302. For example, a delay, between receiving first scan line data and second scan line data, may be associated with an exposure time of the second scan line data. The delay may be sufficiently large enough such that the addition of the time data (e.g., by the timestamp component(s) 110) may not introduce memory overhead.

Figure 4:
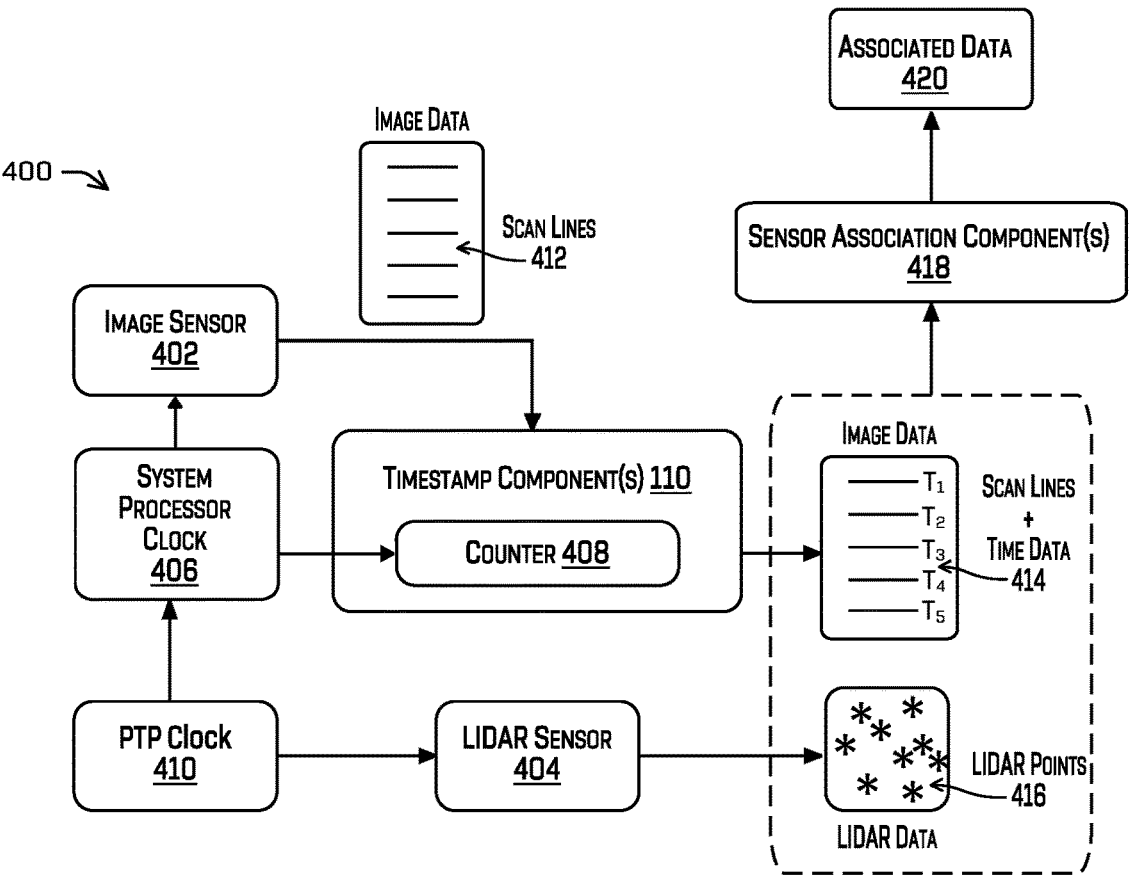
FIG. 4 is a block diagram illustrating example components for implementing an example process flow that includes obtaining time data for association with scan lines, in accordance with examples of the disclosure.

FIG. 4 is a block diagram illustrating example components 400 for implementing an example process flow that includes obtaining time data for association with scan lines, in accordance with examples of the disclosure. In some examples, the components 400 may include one or multiple features, components, and/or functionality of examples described herein with reference to FIGS. 1-3 and 5A-11.

In some examples, the components 400 may include the timestamp component(s) 110, an image sensor 402, a LIDAR sensor 404, a system processor clock 406, a counter 408, and/or a precision time protocol (PTP) clock 410. The timestamp component(s) 110 may receive image data (e.g., scan lines 412). Furthermore, in some implementations, the timestamp component(s) 110 may add time data (e.g., time data 112 described herein with reference to FIGS. 1-3) to each of the scan lines 412 and output image data that includes scan lines with time data 414.

In various examples, the timestamp component(s) 110 may determine time data associated with a scan line. According to some non-limiting examples, the timestamp component(s) 110 may use data from the counter 408 to determine the time data associated with the scan line. For example, the counter 408 may be slaved to the system processor clock 406. In some examples, the system processor clock 406 may be a clock that is hosted by a system processor (not shown). The image sensor 402 may receive data from the system processor clock 406 and/or may be controlled by the system processor in some examples. In some examples, the system processor clock may receive data from the PTP clock 410. Furthermore, the LIDAR sensor 404 may receive data from the PTP clock 410 in some examples.

According to some examples, the LIDAR sensor 404 may output LIDAR data (e.g., LIDAR points 416). In some examples, at least a portion of the time data added to the scan lines 412 to produce the scan lines with time data 414 may be used to determine an association between at least a portion of the image data and at least a portion of the LIDAR data. For example, in some examples the components 400 may include sensor association component(s) that receive the image data (output from the timestamp component(s) 110) and the LIDAR data (output from the LIDAR sensor 404). In some implementations, the sensor association component(s) 418 may use the time data associated with a scan line to determine an association between at least a portion of the scan line and at least a portion of the LIDAR data. Furthermore, in some examples, the LIDAR data may be associated with a timestamp (e.g., for spinning LIDAR, a column may be associated with the same timestamp), and the sensor association component(s) 418 may use the time data associated with the scan line and the timestamp associated with the LIDAR data to determine the association between the portion of the scan lie and the portion of the LIDAR data.

As a non-limiting example, the sensor association component(s) 418 may associate, based at least in part on the time data of the scan line, at least a portion of the pixel data of the scan line with one or more LIDAR points 416 of the LIDAR data. In some cases, the association may indicate that the portion of the pixel data and the LIDAR point(s) were captured substantially contemporaneously (e.g., during a time period that satisfies a time threshold). In some examples, the sensor association component(s) 418 may associate (e.g., fuse) a portion of the image data with a portion of the LIDAR data to produce associated data 420. For example, the association may be based at least in part on the association between the portion of the pixel data and the LIDAR point(s). In some examples, the associated data 420 may be used to control movement of a vehicle (e.g., the vehicle 102 described with reference to FIG. 1).

Figure 5A:
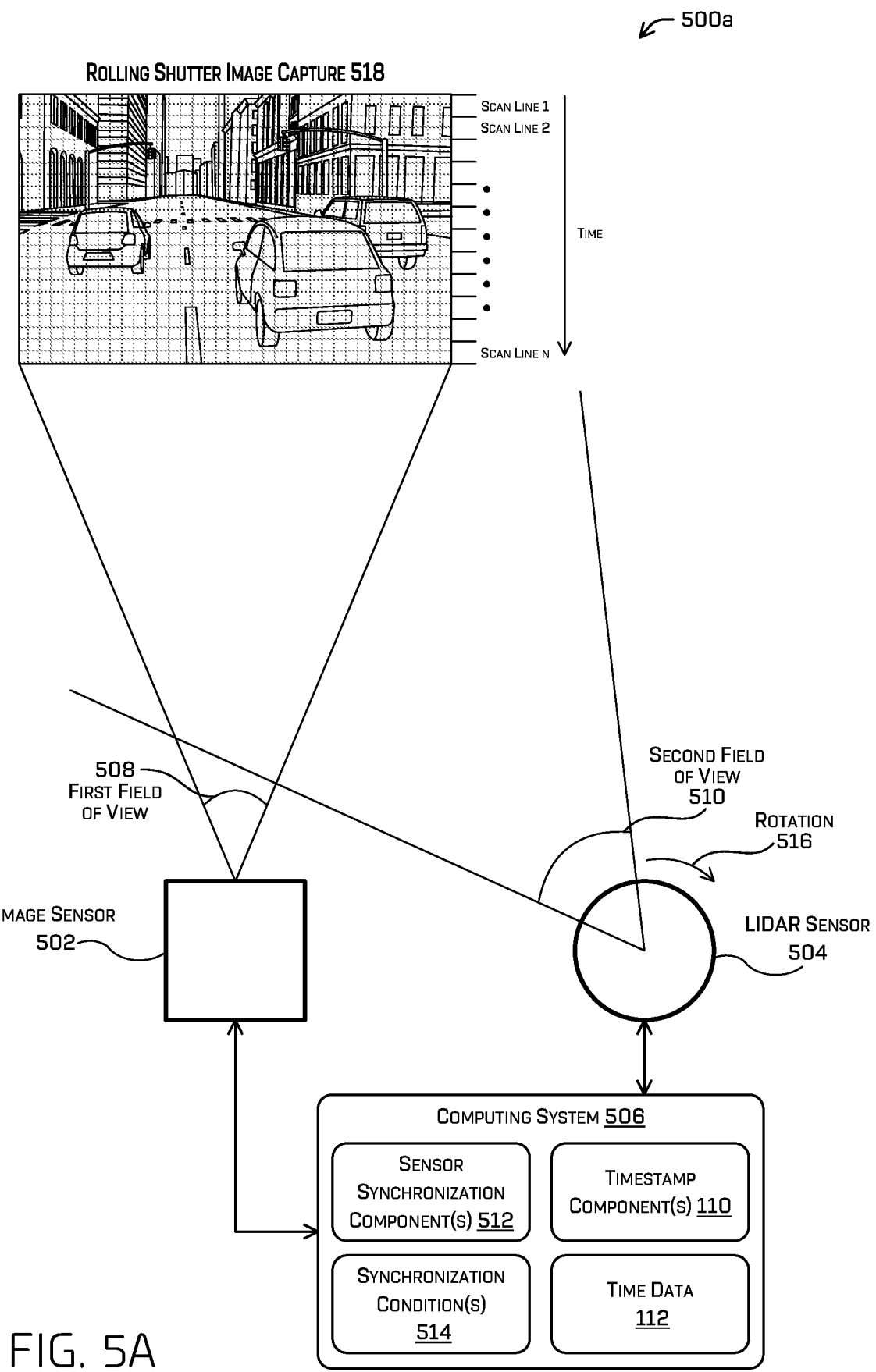
FIG. 5A is a schematic diagram illustrating an example of synchronizing rolling shutter image capture of an image sensor field of view with LIDAR data capture of a LIDAR sensor field of view, in accordance with examples of the disclosure.

FIG. 5A is a schematic diagram illustrating an example 500a of synchronizing rolling shutter image capture of an image sensor field of view with LIDAR data capture of a LIDAR sensor field of view, in accordance with examples of the disclosure. In some examples, the example 500a may include one or multiple features, components, and/or functionality of examples described herein with reference to FIGS. 1-4 and 5B-11.

In some examples, the example 500a may include an image sensor 502, a LIDAR sensor 504, and/or a computing system 506 (e.g., the vehicle computing system 108 described with reference to FIG. 1). The image sensor 502 may have a first field of view 508. The LIDAR sensor 504 may have a second field of view 510. In various examples, a field of view may be associated with the portion of the environment sensed by a sensor at a given time. In some examples, the computing system 506 may include sensor synchronization component(s) 512, synchronization condition(s) 514, timestamp component(s) 110, and/or time data 112.

According to some examples, the second field of view 510 of the LIDAR sensor 504 may move relative to the first field of view 508 of the image sensor 502. In some examples, the second field of view 510 may be rotatable (e.g., about one or more axes). In some non-limiting examples, the second field of view 510 may be rotatable 360 degrees. In some examples, the amount of rotation may be less than 360 degrees. As indicated in FIG. 5A, the rotation 516 of the second field of view 510 is in a clockwise direction. It should be understood, however, that the rotation 516 may be in a counter-clockwise direction and/or may change in direction in some examples.

In various examples, the sensor synchronization component(s) 512 may facilitate the synchronization of image data capture (e.g., by the image sensor 502) with LIDAR data capture (e.g., by the LIDAR sensor 504). For example, the sensor synchronization component(s) 512 may trigger the image sensor 502 to perform a rolling shutter image capture 518 of a scene during a time period in which the LIDAR sensor 504 is capturing LIDAR data of at least a portion of the scene. By synchronizing sensor data capture in this manner, the computing system 506 may be able to accurately associate (e.g., temporally and/or spatially) image data with LIDAR data. In various examples, the sensor synchronization component(s) 512 may implement the synchronization in accordance with the synchronization condition(s) 514. As non-limiting examples, the synchronization condition(s) 514 may include an amount of overlap between the first field of view 508 and the second field of view 510, and/or an overlap between a first particular portion of the first field of view 508 and a second particular portion of the second field of view 510, etc. In at least some examples, the synchronization may be such that a capturing the center scan line in an image corresponds with LIDAR data capture substantially directed to a field of view of the image sensor. In such an example, the amount of LIDAR data which is associated with the same region of an environment associated with the image data is optimized (e.g., maximized).

In some examples, the sensor synchronization component(s) 512 may determine a first orientation of the first field of view 508 of the image sensor 502. Furthermore, the sensor synchronization component(s) 512 may determine a second orientation of the second field of view 510 of the LIDAR sensor 504. In some examples, the respective orientations of the image sensor 502 and/or the LIDAR sensor 504 may be tracked. According to some examples, the first orientation and the second orientation may be tracked relative to one another. The sensor synchronization component(s) 512 may use field of view orientation information (e.g., the first orientation, the second orientation, etc.) as an input for causing the image sensor 502 to initiate the rolling shutter image capture 518 of the first field of view 508, e.g., such that at least a first portion of the first field of view 508 overlaps at least a second portion of the second field of view 510 in accordance with the synchronization condition(s) 514. In various examples, the second field of view 510 may move relative to the first field of view 508 during the rolling shutter image capture 518.

According to some implementations, the sensor synchronization component(s) 512 may time the rolling shutter image capture 518 such that at least a portion of the scan lines (e.g., scan line 1, scan line 2, . . . scan line n) of an image frame associated with a scene are captured while the LIDAR sensor 504 is capturing LIDAR data associated with at least a portion of the scene (e.g., at least a portion of the scene is within the second field of view 510 of the LIDAR sensor 504). In some examples, the sensor synchronization component(s) 512 may time the rolling shutter image capture 518 such that a majority of the scan lines of the image frame are captured during a time period associated with the LIDAR sensor 504 capturing the second field of view 510 of at least a portion of the scene, e.g., as indicated in FIG. 5A. In some examples, the sensor synchronization component(s) 512 may time the rolling shutter image capture 518 such that a particular scan line (or set of scan lines) is captured in association with a particular portion of the second field of view 510. As a non-limiting example, the sensor synchronization component(s) 512 may time the rolling shutter image capture 518 such that a central scan line (e.g. a centermost scan line, a central set of scan lines, etc.) may be captured in association with LIDAR data captured in a central portion of the second field of view 510.

In some examples, the sensor synchronization component(s) 512 may determine a first pose of the image sensor 502. The first pose may include a first position and/or a first orientation (e.g., an x-, y-, z-position, roll, pitch, and/or yaw) associated with the image sensor 502. Furthermore, the sensor synchronization component(s) 512 may determine a second pose of the LIDAR sensor 504. The second pose may include a second position and/or a second orientation (e.g., an x-, y-, z-position, roll, pitch, and/or yaw) associated with the LIDAR sensor 504. In some examples, the respective poses of the image sensor 502 and/or the LIDAR sensor 504 may be tracked. According to some examples, the first pose and the second pose may be tracked relative to one another. The sensor synchronization component(s) 512 may use the pose information (e.g., the first pose, the second pose, etc.) as an input for causing the image sensor 502 to initiate the rolling shutter image capture 518 of the first field of view 508, e.g., such that at least a first portion of the first field of view 508 overlaps at least a second portion of the second field of view 510 in accordance with the synchronization condition(s) 514.

In some examples, the sensor synchronization component(s) 512 may estimate an exposure time for the image frame of the rolling shutter image capture 518. For example, the exposure time may be estimated prior to the rolling shutter image capture 518 being performed. In some examples, the sensor synchronization component(s) 512 may receive exposure time data associated with a prior rolling shutter image capture. The exposure time for the image frame of the rolling shutter image capture 518 may be estimated based at least in part on the exposure time data associated with the prior rolling shutter image capture (e.g., by calculating a difference in time between a timestamp associated with a first scan line and a last scan line). According to various examples, the sensor synchronization component(s) 512 may use the estimated exposure time as an input for causing the image sensor 502 to initiate the rolling shutter image capture 518 of the first field of view 508, e.g., such that at least a first portion of the first field of view 508 overlaps at least a second portion of the second field of view 510 in accordance with the synchronization condition(s) 514.

According to some examples, the sensor synchronization component(s) 512 may use time data associated with one or more scan lines as an input for causing the image sensor 502 to initiate the rolling shutter image capture 518 of the first field of view 508, e.g., such that at least a first portion of the first field of view 508 overlaps at least a second portion of the second field of view 510 in accordance with the synchronization condition(s) 514. In some examples, the sensor synchronization component(s) 512 may cause the image sensor 502 to initiate the rolling shutter image capture 518 based at least in part on time data associated with one or more scan lines of a prior rolling shutter image capture. Additionally, or alternatively, the sensor synchronization component(s) 512 may cause the image sensor 502 to adjust an exposure time of at least one scan line of the rolling shutter image capture 518, e.g., based at least in part on time data associated with one or more scan lines of the rolling shutter image capture 518 and/or time data associated with one or more scan lines of a prior rolling shutter image capture.

Figure 5B:
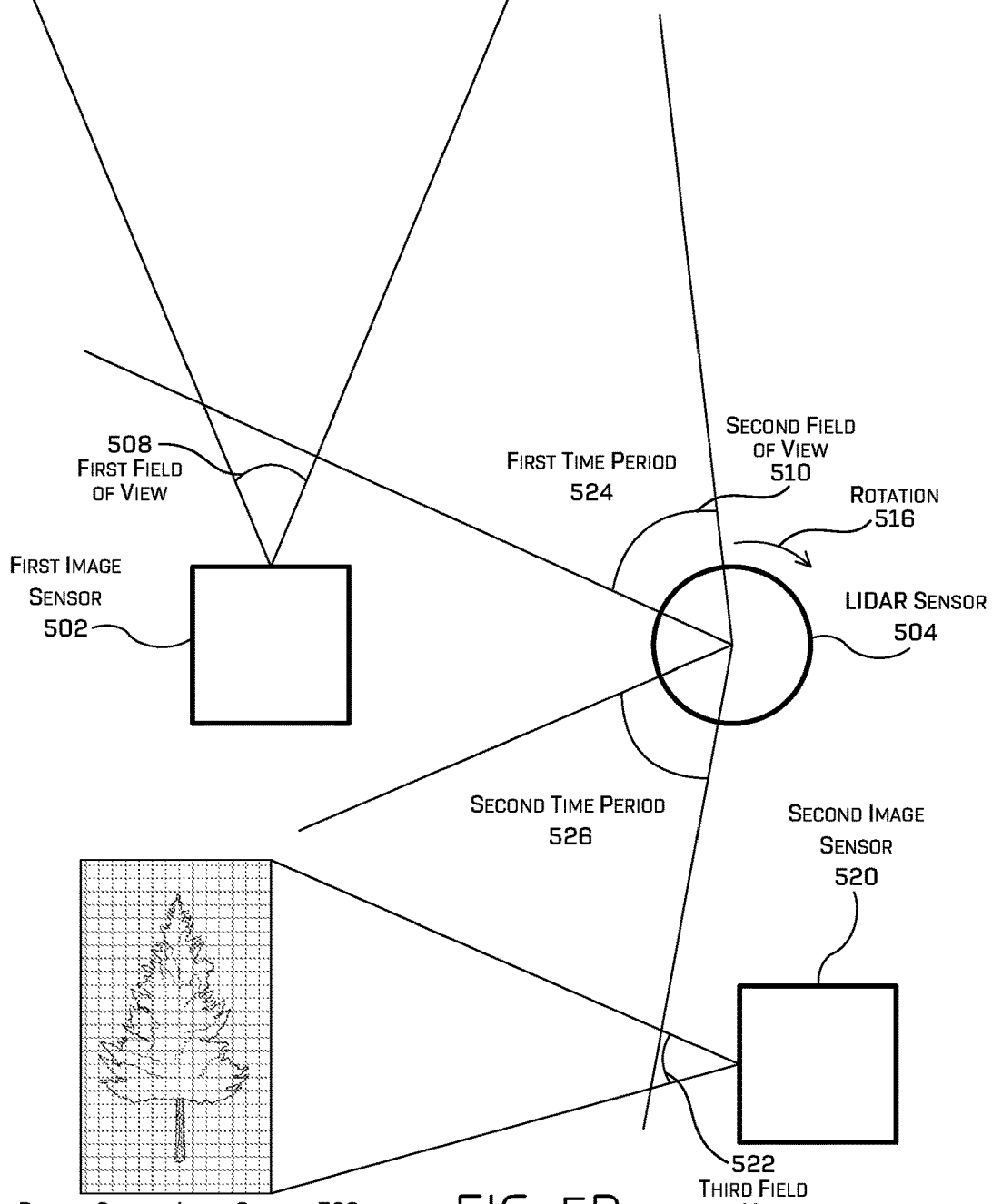
FIG. 5B is a schematic diagram illustrating an example of synchronizing rolling shutter image capture of multiple image sensor fields of view with LIDAR data capture of a LIDAR sensor field of view, in accordance with examples of the disclosure.

FIG. 5B is a schematic diagram illustrating an example 500b of synchronizing rolling shutter image capture of multiple image sensor fields of view with LIDAR data capture of a LIDAR sensor field of view, in accordance with examples of the disclosure. In some examples, the example 500b may include one or multiple features, components, and/or functionality of examples described herein with reference to FIGS. 1-5A and 6-11.

In some examples, the example 500b may include the image sensor 502 (also referred to herein as the "first image sensor 502), the LIDAR sensor 504, and/or the computing system 506 (not shown in FIG. 5B) described herein with reference to FIG. 5A. Furthermore, the example 500b may include a second image sensor 520 having a third field of view 522.

According to some examples, the second field of view 510 of the LIDAR sensor 504 may move relative to the first field of view 508 (of the first image sensor 502) and/or the third field of view 522 (of the second image sensor 520). In some examples, the second field of view 510 may be rotatable (e.g., about one or more axes). In some non-limiting examples, the second field of view 510 may be rotatable 360 degrees. In some examples, the amount of rotation may be less than 360 degrees.

As indicated in FIG. 5B, the second field of view 510 of the LIDAR sensor 504 may at least partially overlap with the first field of view 508 of the first image sensor 502 during a first time period. Furthermore, the second field of view 510 of the LIDAR sensor 504 may at least partially overlap with the third field of view of the second image sensor 520 during a second time period 526. For example, the second field of view 510 of the LIDAR sensor 504 may have moved (e.g., via rotation 516) a certain amount (e.g., based at least in part on the rotational speed of the second field of view 510) between the first time period 524 and the second time period 526.

In some examples, the sensor synchronization component(s) 512 (shown in FIG. 5A) may facilitate the synchronization of image data capture (e.g., by the first image sensor 502 and/or the second image sensor 520, etc.) with LIDAR data capture (e.g., by the LIDAR sensor 504). As discussed herein with reference to FIG. 5A, the sensor synchronization component(s) 512 may trigger the first image sensor 502 to perform a rolling shutter image capture 518 (also referred to herein as the "first rolling shutter image capture 518) of a first scene during a time period in which the LIDAR sensor 504 is capturing LIDAR data of at least a portion of the first scene, e.g., during the first time period 524. Additionally, or alternatively, the sensor synchronization component(s) 512 may trigger the second image sensor 520 to perform a second rolling shutter image capture 528 of a second scene during a time period in which the LIDAR sensor 504 is capturing LIDAR data of at least a portion of the second scene, e.g., during the second time period 526. In various examples, the sensor synchronization component(s) 512 may implement the synchronization in accordance with the synchronization condition(s) 514 (shown in FIG. 5A). As non-limiting examples, the synchronization condition(s) 514 may include a first central portion of an image frame (produced by the second rolling shutter image capture 528) being substantially aligned with a second central portion of the second field of view 510 (of the LIDAR sensor 504), and/or a majority of scan lines (e.g., of the image frame produced by the second rolling shutter image capture 528) being captured during the second time period 526 associated with the second field of view 510 (of the LIDAR sensor 504), etc.

In some examples, the sensor synchronization component(s) 512 may determine an orientation of the third field of view 522 of the second image sensor 520. Furthermore, the sensor synchronization component(s) 512 may determine an orientation of the second field of view 510 of the LIDAR sensor 504. In some examples, the respective orientations of the second image sensor 520 and/or the LIDAR sensor 504 may be tracked. According to some examples, the orientations may be tracked relative to one another. For example, the sensor synchronization component(s) 512 may determine an orientation of the first field of view with respect to the second field of view. The sensor synchronization component(s) 512 may use field of view orientation information as an input for causing the second image sensor 520 to initiate the second rolling shutter image capture 528 of the third field of view 522, e.g., such that at least a portion of the third field of view 522 (of the second image sensor 520) overlaps at least a portion of the second field of view 510 (of the LIDAR sensor 504) in accordance with the synchronization condition(s) 514. In various examples, the second field of view 510 (of the LIDAR sensor 504) may move relative to the third field of view 522 (of the second image sensor 520) during the second rolling shutter image capture 528.

According to some implementations, the sensor synchronization component(s) 512 may time the second rolling shutter image capture 528 such that at least a portion of the scan of an image frame associated with a second scene are captured while the LIDAR sensor 504 is capturing LIDAR data associated with at least a portion of the second scene (e.g., at least a portion of the second scene is within the second field of view 510 of the LIDAR sensor 504). In some examples, the sensor synchronization component(s) 512 may time the second rolling shutter image capture 528 such that a majority of the scan lines of the image frame are captured during a time period associated with the LIDAR sensor 504 capturing the second field of view 510 of at least a portion of the second scene, e.g., during the second time period 526. In some examples, the sensor synchronization component(s) 512 may time the second rolling shutter image capture 528 such that a particular scan line (or set of scan lines) is captured in association with a particular portion of the second field of view 510 of the LIDAR sensor 504. As a non-limiting example, the sensor synchronization component(s) 512 may time the second rolling shutter image capture 528 such that a central portion of the scan lines (e.g., a center scan line, a central set of scan lines, etc.) may be captured in association with LIDAR data captured in a middle portion of the second field of view 510 of the LIDAR sensor 504.

In some examples, the sensor synchronization component(s) 512 may determine a pose of the second image sensor 520. The pose of the second image sensor 520 may include a position and/or an orientation (e.g., an x-, y-, z-position, roll, pitch, and/or yaw) associated with the second image sensor 520. Furthermore, the sensor synchronization component(s) 512 may determine a pose of the LIDAR sensor 504. The pose of the LIDAR sensor 504 may include a position and/or an orientation (e.g., an x-, y-, z-position, roll, pitch, and/or yaw) associated with the LIDAR sensor 504. In some examples, the respective poses of the second image sensor 520 and/or the LIDAR sensor 504 may be tracked. The sensor synchronization component(s) 512 may use the pose information as an input for causing the second image sensor 520 to initiate the second rolling shutter image capture 528 of the third field of view 522, e.g., such that at least a portion of the third field of view 522 (of the second image sensor 520) overlaps at least a portion of the second field of view 510 (of the LIDAR sensor 504) in accordance with the synchronization condition(s) 514.

In some examples, the sensor synchronization component(s) 512 may estimate an exposure time for the image frame of the second rolling shutter image capture 528. For example, the exposure time may be estimated prior to the second rolling shutter image capture 528 being performed. In some examples, the sensor synchronization component(s) 512 may receive exposure time data associated with a prior rolling shutter image capture of the second image sensor 520. The exposure time for the image frame of the second rolling shutter image capture 528 may be estimated based at least in part on the exposure time data associated with the prior rolling shutter image capture. According to various examples, the sensor synchronization component(s) 512 may use the estimated exposure time as an input for causing the second image sensor 520 to initiate the second rolling shutter image capture 528 of the third field of view 522, e.g., such that at least a portion of the third field of view 522 (of the second image sensor 520) overlaps at least a portion of the second field of view 510 (of the LIDAR sensor 504) in accordance with the synchronization condition(s) 514.

According to some examples, the sensor synchronization component(s) 512 may use time data associated with one or more scan lines as an input for causing the second image sensor 520 to initiate the second rolling shutter image capture 528 of the third field of view 522, e.g., such that at least a portion of the third field of view 522 (of the second image sensor 520) overlaps at least a portion of the second field of view 510 (of the LIDAR sensor 504) in accordance with the synchronization condition(s) 514. In some examples, the sensor synchronization component(s) 512 may cause the second image sensor 520 to initiate the second rolling shutter image capture 528 based at least in part on time data associated with one or more scan lines of a prior rolling shutter image capture of the second image sensor 520. Additionally, or alternatively, the sensor synchronization component(s) 512 may cause the second image sensor 520 to adjust an exposure time of at least one scan line of the second rolling shutter image capture 528, e.g., based at least in part on time data associated with one or more scan lines of the second rolling shutter image capture 528 and/or time data associated with one or more scan lines of a prior rolling shutter image capture of the second image sensor 520.

In some examples, first time data (e.g., a first timestamp) associated with one or more scan lines (e.g., of an image frame produced by a rolling shutter image capture, such as the first rolling shutter image capture 518 or the second rolling shutter image capture 528, etc.) may be determined based at least in part on time data from a system processor clock that is synchronized with a precision time protocol (PTP) clock, e.g., as described herein with reference to FIG. 4. Additionally, or alternatively, second time data (e.g., a second timestamp) associated with a measurement captured by the LIDAR sensor 504 may be determined based at least in part on time data from the PTP clock. In some examples, the first image sensor 502 and/or the second image sensor 520 may initiate a rolling shutter image capture based at least in part on the first timestamp and/or the second timestamp.

Figure 6:
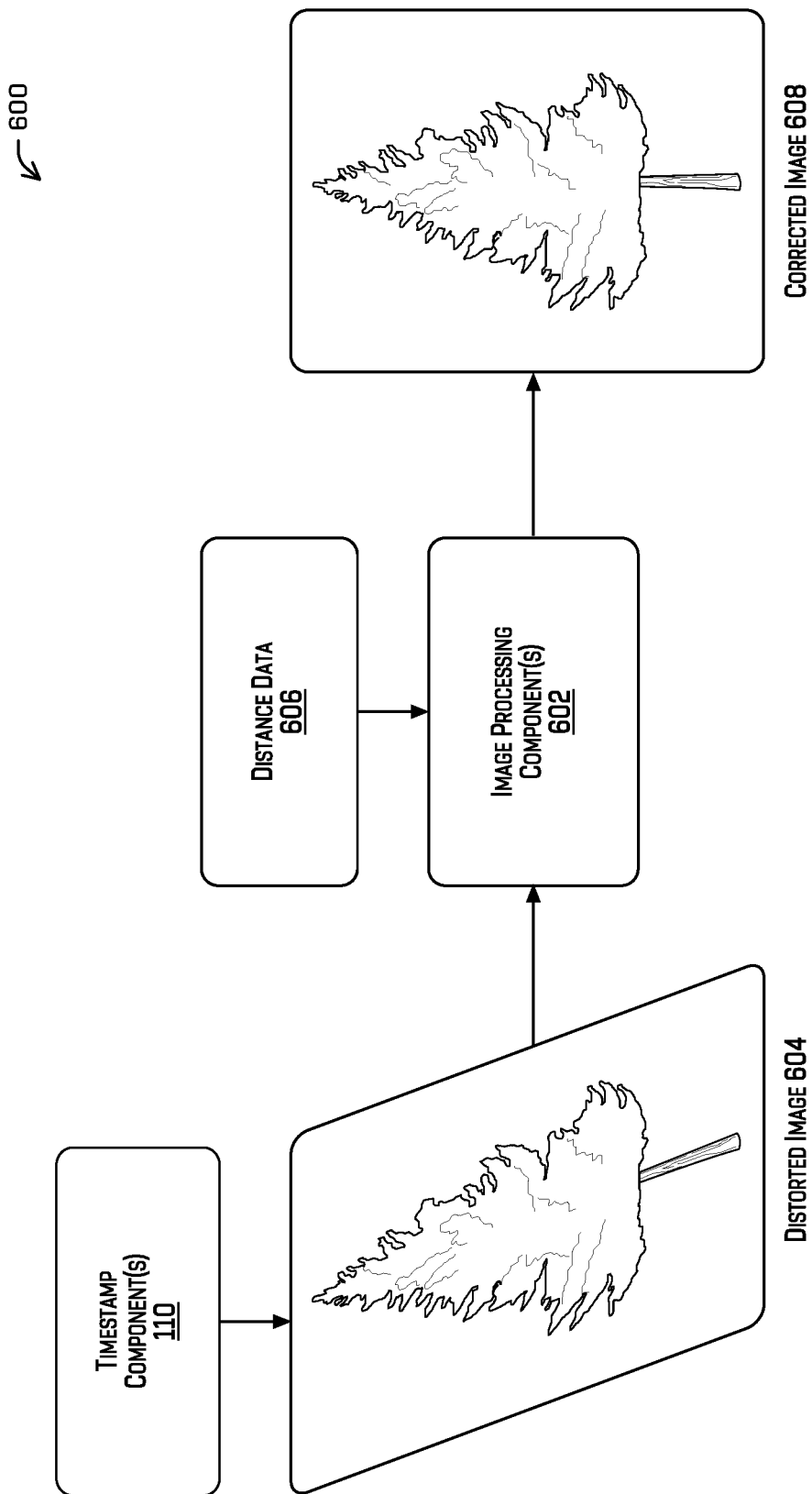
FIG. 6 is a schematic block diagram illustrating an example of image processing component(s) using scan line time data to correct a distorted image, in accordance with examples of the disclosure.

FIG. 6 is a schematic block diagram illustrating an example 600 of image processing component(s) using scan line time data to correct a distorted image, in accordance with examples of the disclosure. In some examples, the example 600 may include one or multiple features, components, and/or functionality of examples described herein with reference to FIGS. 1-5B and 7-11.

According to some examples, the example 600 may include one or more image processing components 602. In some examples, the image processing component(s) 602 may reside in the vehicle computing system 108 (described herein with reference to FIG. 1), the computing system 506 (described herein with reference to FIG. 5A), the vehicle computing device 1104 (described herein with reference to FIG. 11), and/or the computing devices 1140 (described herein with reference to FIG. 11).

In some examples, the image processing component(s) 602 may be configured to perform image processing on images. In example 600, the image processing component(s) 602 receives, as input, a distorted image 604 (e.g., image data associated with a distorted image). In some examples, the distorted image 604 may be associated with an image frame having time data added with individual scan lines, e.g., by the timestamp component(s) 110, which may also be useful to perform image rectification, sensor calibration, cross-modal calibration, 3D reconstruction, tracking, feature extraction, multi-modal sensor fusion, and the like. In various examples, the distorted image 604 may include one or more distortion effects, e.g., distortion effects caused by motion associated with a rolling shutter image capture. As non-limiting examples, the distortion effect(s) may include wobble, skew, spatial aliasing, and/or temporal aliasing. The distorted image 604 may include the distortion effect(s)

because the image data may be obtained via a rolling shutter image capture of an object, and the rolling shutter image capture may be performed by a moving image sensor. That is, each of the scan lines may be associated with a respective portion of the object being imaged at one or more respective distances (e.g., in view of relative motion between the image sensor and the object).

According to some examples, the image processing component(s) 602 may receive, as input, distance data 606 associated with one or more scan lines of the rolling shutter image capture. As a non-limiting example, the distance data 606 may be associated with LIDAR data captured by a LIDAR sensor. The LIDAR sensor may capture LIDAR data associated with the object, and the LIDAR data may include distance data 606 representing a distance between the LIDAR sensor and the object at a given time. The distance data 606 may be used to determine a distance between the image sensor and the object at a given time. The image processing component(s) 602 may modify, based at least in part on the distance data 606 and/or time data added to one or more of the scan lines of the image frame associated with the distorted image 604, the distorted image 604 to correct and/or compensate for the distortion effect(s) of the distorted image 604. The image processing component(s) 602 may output a corrected image 608 (e.g., image data associated with a corrected image). In examples, the corrected image 608 may be distorted less than the distorted image 604, as the image processing component(s) 602 have corrected and/or compensated for the distortion effect(s) of the distorted image 604.

Figure 7:
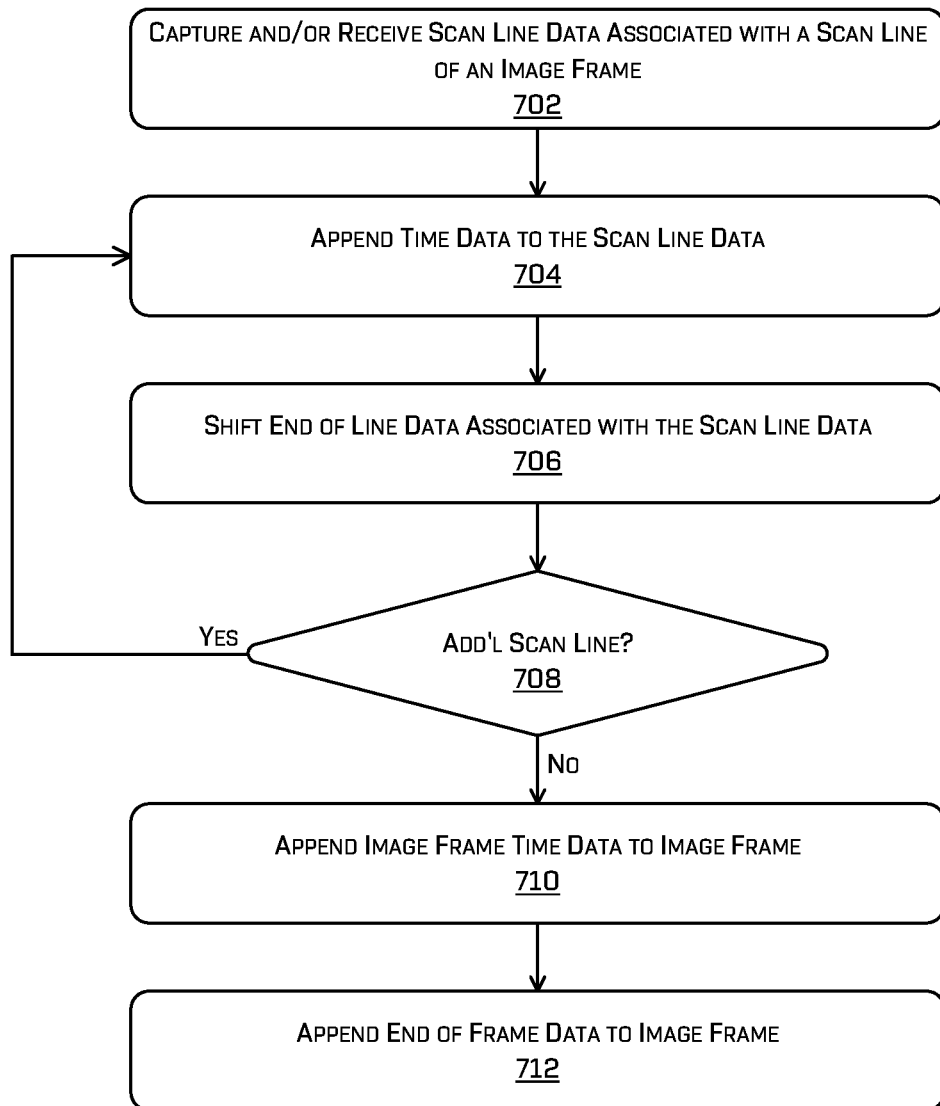
FIG. 7 is a flow chart illustrating an example process for adding time data to one or more scan lines of an image frame, in accordance with examples of the disclosure.

FIG. 7 is a flow chart illustrating an example process 700 for adding time data to one or more scan lines of an image frame, in accordance with examples of the disclosure. In some examples, the process 700 may include one or multiple features, components, and/or functionality of examples described herein with reference to FIGS. 1-6 and 8-11.

At 702, the process 700 may include capturing and/or receiving scan line data (e.g., first scan line data) associated with a scan line (e.g., a first scan line) of an image frame. For example, first scan line data associated with a first scan line may be captured by an image sensor. In some examples, the image sensor may perform a rolling shutter image capture that produces scan lines including the first scan line and one or more additional scan lines.

At 704, the process 700 may include appending time data to the scan line data. In some examples, first time data may be appended to the first scan line data, e.g., as indicated in FIGS. 2 and 3. At 706, the process 700 may include delaying first end of line data associated with the first scan line data. In some examples, the first end of line data may be delayed based at least in part on appending the first time data, e.g., as indicated in FIGS. 2 and 3. The first end of line data may indicate an end of the first scan line.

At 708, the process 700 may include determining whether the image frame includes an additional scan line. If, at 708, it is determined that the image frame includes an additional scan line, then the process 700 may include appending time data to the scan line data of the additional scan line (at 704) and delaying end of line data associated with the scan line data of the additional scan line (at 706). For example, it may be determined that the image frame includes a second scan line associated with second scan line data. Second time data may be appended to the second scan line data. Furthermore, second end of line data may be associated with the second scan line data may be delayed based at least in part on appending the second time data to the second scan line data. The second end of line data may indicate an end of the second line. In any of the examples described herein, end of line data may not be appended. As a non-limiting example of such, a scan line width may be defined such that an amount of data is associated with each scan line. In such examples, a width associated with the data, and made available to an image interpreter, may be increased to account for additional data at the end of each scan line indicative of the appended time data.

In some examples, the first scan line data may be associated with a first exposure time, and the second scan line data may be associated with a second exposure time that is different than the first exposure time. In other examples, the first exposure time and the second exposure time may be the same.

If, at 708, it is determined that the image frame does not include an additional scan line, then the process 700 may include appending image frame time data to the image frame (at 710). At 712, the process 700 may include appending end of frame data to the image frame. The end of frame data may indicate an end of the image frame.

Figure 8:
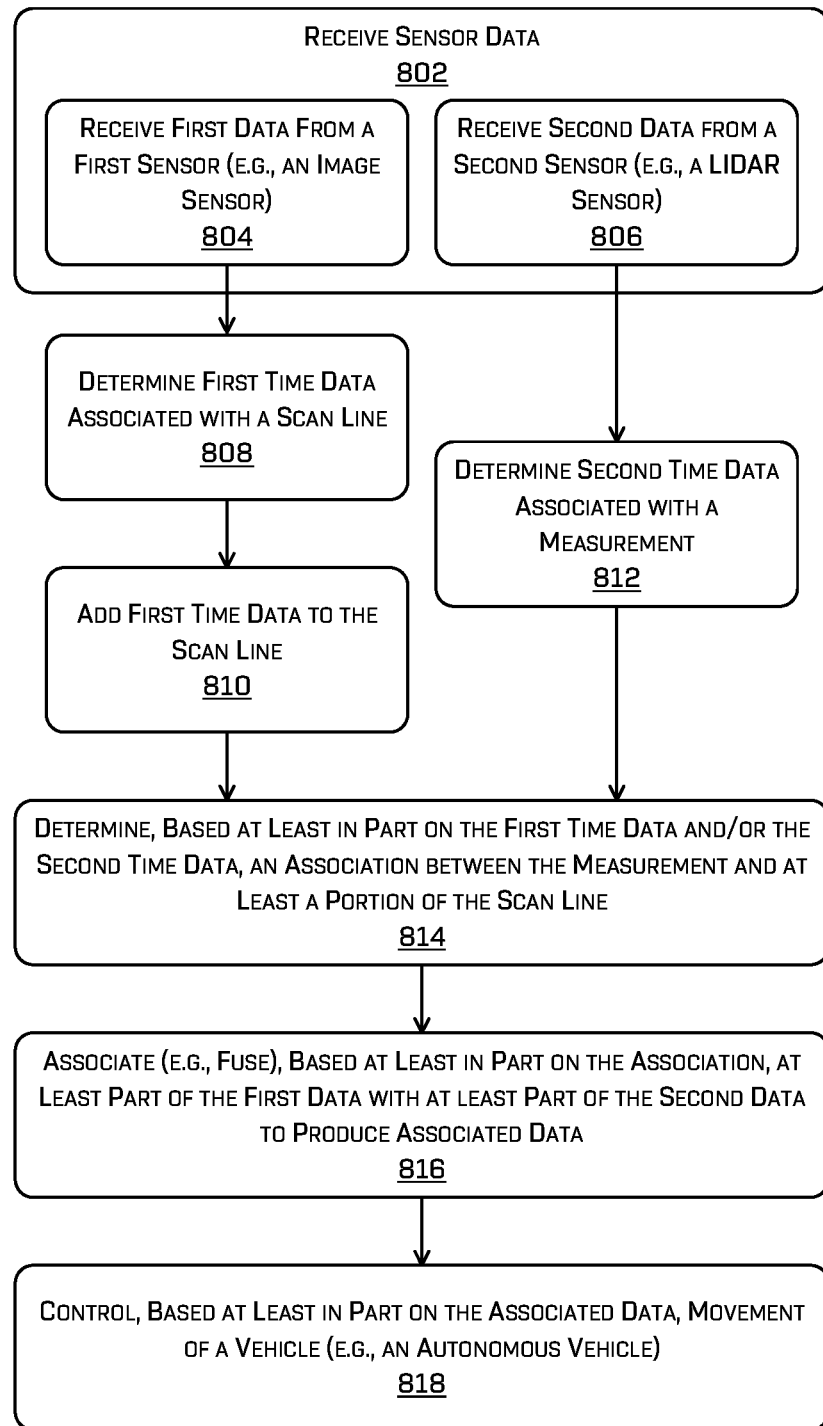
FIG. 8 is a flow chart illustrating an example process for determining, based at least in part on time data added to a scan line of an image frame, an association between data from multiple sensors, in accordance with examples of the disclosure.

FIG. 8 is a flow chart illustrating an example process 800 for determining, based at least in part on time data added to a scan line of an image frame, an association between data from multiple sensors, in accordance with examples of the disclosure. In some examples, the process 800 may include one or multiple features, components, and/or functionality of examples described herein with reference to FIGS. 1-7 and 9-11.

At 802, the process 800 may include receiving sensor data. For example, at 804, the process 800 may include receiving first data from a first sensor (e.g., an image sensor). At 806, the process 800 may include receiving second data from a second sensor (e.g., a LIDAR sensor). In some examples, the first sensor may have a first sensor modality, and the second sensor may have a second sensor modality that is different than the first sensor modality. In some non-limiting examples, the second sensor may include another image sensor, a LIDAR sensor, a radar sensor, a time-of-flight sensor, and/or the like. In some examples, the sensor data may be captured and/or received periodically, continuously (e.g., in near real-time), and/or upon the occurrence of a triggering event (e.g., upon detection of motion, at certain speeds, etc.).

At 808, the process 800 may include determining first time data associated with a scan line. In some examples, the first time data may be determined based at least in part on data obtained from a counter and/or a clock. For example, the data may be obtained from a counter (e.g., counter 408 described herein with reference to FIG. 4). The counter may be slaved to a clock of a system processor (e.g., system processor clock 406 described herein with reference to FIG. 4). In some examples, the clock of the system processor may receive data from a PTP clock (e.g., PTP clock 410 described herein with reference to FIG. 4).

At 810, the process 800 may include adding the first time data to the scan line. For example, the first time data may be added to the scan line, such that the first time data is between scan line data and end of line data associated with the scan line, e.g., as indicated in FIGS. 2 and 3. In some examples, the end of line data may be shifted from a first position to a second position, e.g., to accommodate the first time data between the end of line data and the scan line data. The scan line data may include pixel data associated with pixels exposed to light during the rolling shutter image capture of the scan line.

At 812, the process 800 may include determining second time data associated with a measurement. For example, the measurement may include data captured by the second sensor. In some examples, the measurement may be a LIDAR point captured by a LIDAR sensor. In a non-limiting example, the second time data may include a time (and/or a time period) at which the measurement was captured and/or received.

At 814, the process 800 may include determining an association between the measurement and at least a portion of the scan line. For example, the association may be determined based at least in part on the first time data and/or the second time data. In some examples, the measurement and the portion of the scan line may be associated based at least in part on a determination that a time difference between the first time data and the second time data satisfies a threshold time difference. For example, the threshold time difference may be set to a low value such that the measurement and the portion of the scan line are associated with one another if they are captured substantially contemporaneously. The association between the measurement and the portion of the scan line may be mapped in a database in some examples. In some examples, the measurement and the portion of the scan line may be associated with one another regardless of the time difference between the first time data and the second time data.

At 816, the process 800 may include associating (e.g., fusing) at least part of the first data with at least part of the second data to produce associated data. For example, associating the data may be based at least in part on the association between the measurement and the scan line. In some examples, at least part of the first data may be associated with at least part of the second data based at least in part on a determination that a time difference between the first time data and the second time data satisfies a threshold time difference.

At 818, the process 800 may include controlling movement of a vehicle (e.g., an autonomous vehicle). For example, the movement of the vehicle may be controlled based at least in part on the associated data. As a non-limiting example, the associated data may indicate a location of an obstacle in the environment of the vehicle. A trajectory and/or a route that avoids a collision between the vehicle and the obstacle may be determined based at least in part on the associated data. The vehicle may be controlled to move along the trajectory and/or route.

Figure 9:
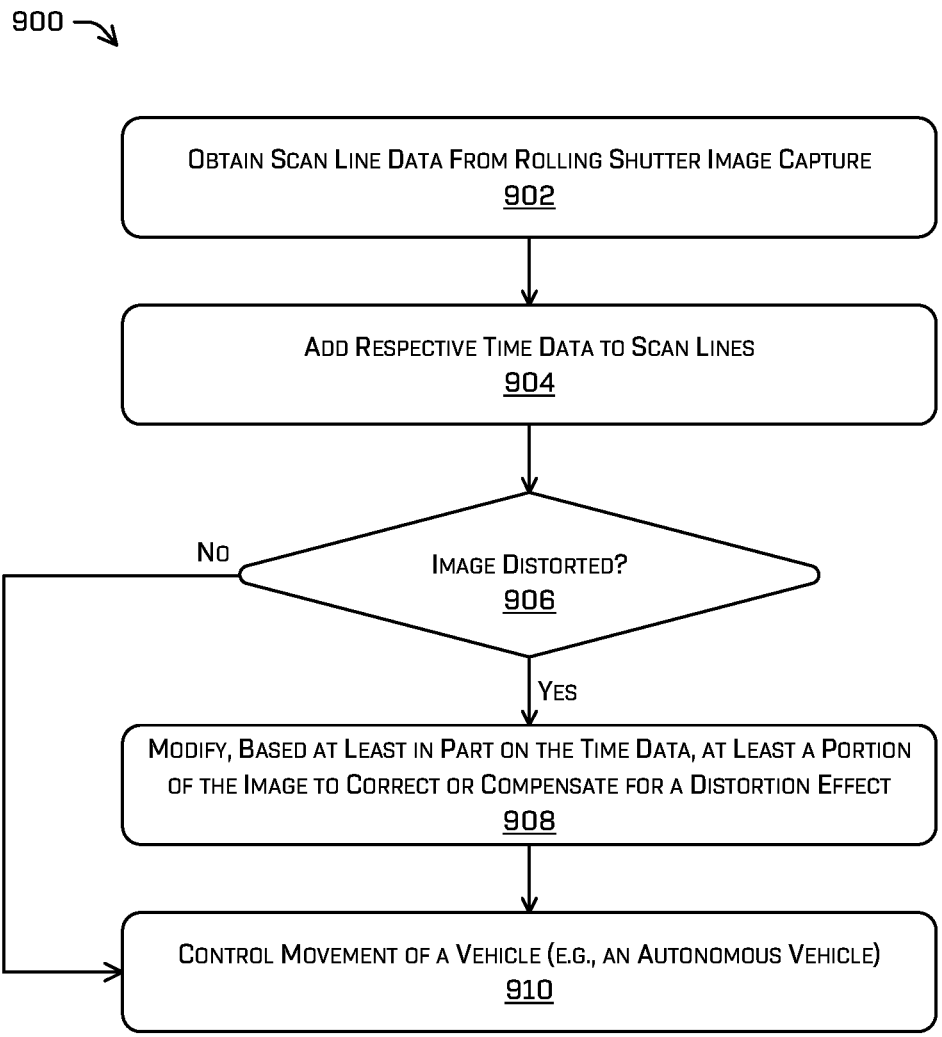
FIG. 9 is a flow chart illustrating an example process for modifying, based at least in part on time data added to a scan line of an image frame, an image to correct or compensate for a distortion effect, in accordance with examples of the disclosure.

FIG. 9 is a flow chart illustrating an example process 900 for modifying, based at least in part on time data added to a scan line of an image frame, an image to correct or compensate for a distortion effect, in accordance with examples of the disclosure. In some examples, the process 900 may include one or multiple features, components, and/or functionality of examples described herein with reference to FIGS. 1-8, 10, and 11.

At 902, the process 900 may include obtaining scan line data from a rolling shutter image capture. For example, an image sensor may perform the rolling shutter image capture. The rolling shutter image capture may produce scan lines of an image frame, e.g., as described herein with reference to FIGS. 1 and 2.

At 904, the process 900 may include adding respective time data to the scan lines. For example, first time data may be appended to first scan line data of a first scan line, second time data may be appended to second scan line data of a second scan line, etc.

At 906, the process 900 may include determining whether an image is distorted. If, at 906, it is determined that the image is distorted, then the process 900 may include modifying at least a portion of the image to correct or compensate for a distortion effect (at 908), e.g., as described herein with reference to FIG. 6. In various examples, the distortion effects may be caused by motion associated with a rolling shutter image capture (e.g., relative motion between an image sensor and an object in the environment). As non-limiting examples, the distortion effect(s) may include wobble, skew, spatial aliasing, and/or temporal aliasing. In some examples, the image may be modified based at least in part on the time data added to one or more scan lines.

At 910, the process 900 may include controlling movement of a vehicle (e.g., an autonomous vehicle). For example, movement of the vehicle may be controlled based at least in part on the modified image. As a non-limiting example, the modified image may indicate a location of an obstacle in the environment of the vehicle. A trajectory and/or a route that avoids a collision between the vehicle and the obstacle may be determined based at least in part on the modified image. The vehicle may be controlled to move along the trajectory and/or route.

If, at 906, it is determined that that the image is not distorted, then the process 900 may include controlling movement of the vehicle based at least in part on the image (at 910).

Figure 10:
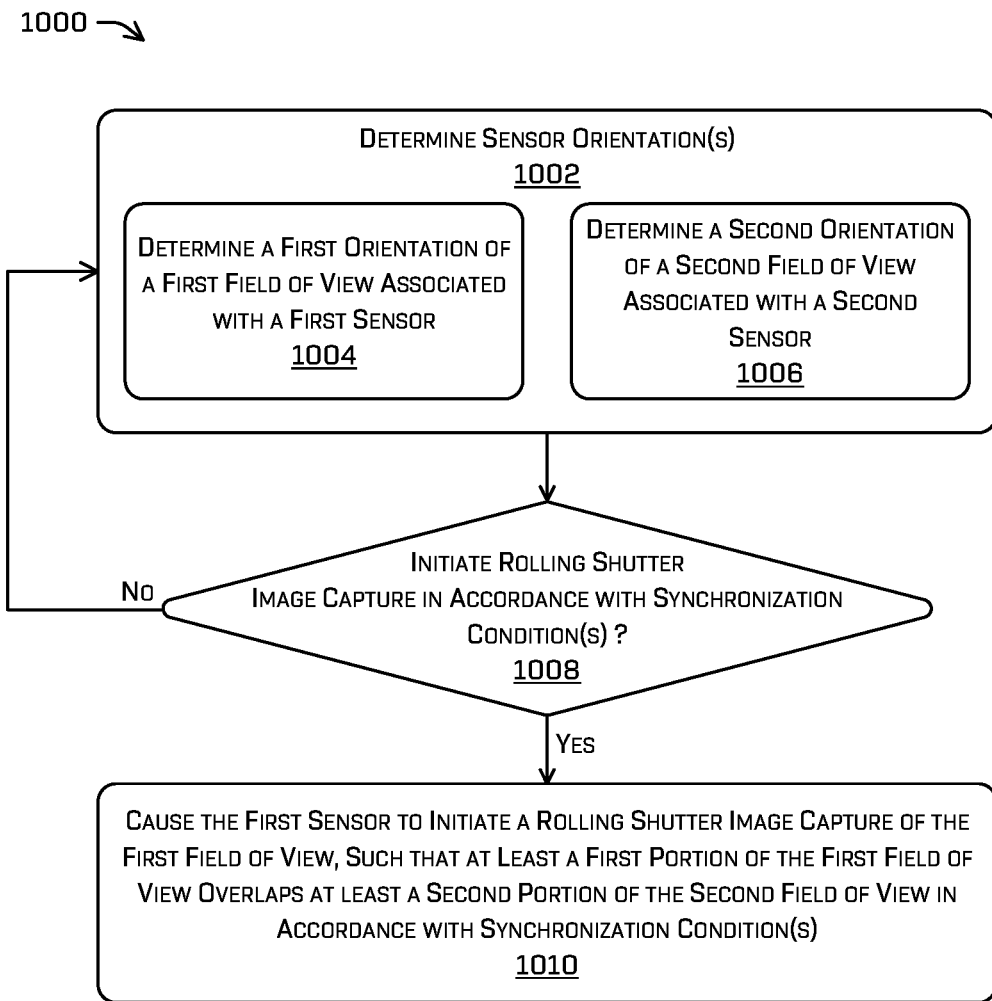
FIG. 10 is a flow chart illustrating an example process for synchronizing rolling shutter image capture of a first field of view (associated with a first sensor) with data capture of a second field of view (associated with a second sensor), in accordance with examples of the disclosure.

FIG. 10 is a flow chart illustrating an example process 1000 for synchronizing rolling shutter image capture of a first field of view (associated with a first sensor) with data capture of a second field of view (associated with a second sensor), in accordance with examples of the disclosure. In some examples, the process 1000 may include one or multiple features, components, and/or functionality of examples described herein with reference to FIGS. 1-9 and 11.

At 1002, the process 1000 may include determining sensor orientation(s), which may include relative poses (positions and/or orientations) of the sensor(s). For example, at 1004, the process 1000 may include determining a first orientation of a first field of view associated with a first sensor. At 1006, the process 1000 may include determining a second orientation of a second field of view associated with a second sensor. In some examples, a field of view may comprise a frustum (e.g., a 3D field of view for capturing data by a sensor). In some examples, the first sensor may comprise an image sensor. Furthermore, as non-limiting examples, the second sensor may comprise another image sensor, a LIDAR sensor, a radar sensor, and/or a time-of-flight sensor, etc.

According to some examples, the second field of view associated with the second sensor may move relative to the first field of view associated with the first sensor. In some examples, the second field of view may be rotatable, e.g., as described herein with reference to FIGS. 5A and 5B.

In some examples, the determining sensor orientation(s) (at 1002) may include determining a first pose of the first sensor and/or determining a second pose of the second sensor. The first pose may include a first position and/or a first orientation (e.g., an x-, y-, z-position, roll, pitch, and/or yaw) associated with the first sensor. The second pose may include a second position and/or a second orientation (e.g., an x-, y-, z-position, roll, pitch, and/or yaw) associated with the second sensor. In some examples, the respective poses of the first sensor and/or the second sensor may be tracked. According to some examples, the first pose and the second pose may be tracked relative to one another.

At 1008, the process 1000 may include determining whether to initiate a rolling shutter image capture in accordance with one or more synchronization conditions. If, at 1008, it is determined to initiate a rolling shutter image capture in accordance with synchronization condition(s), then the process 1000 may include causing the first sensor to initiate a rolling shutter image capture of the first field of view, such that at least a first portion of the first field of view overlaps at least a second portion of the second field of view in accordance with synchronization condition(s) (at 1010). As non-limiting examples, the synchronization condition(s) may include an amount of overlap between the first field of view and the second field of view, and/or an overlap between a first particular portion of the first field of view and a second particular portion of the second field of view, etc.

According to some implementations, the rolling shutter image capture may be timed such that at least a portion of the scan lines of an image frame associated with a scene are captured by the first sensor while the second sensor is capturing other data associated with at least a portion of the scene (e.g., at least a portion of the scene is within the second field of view associated with the second sensor). In some examples, the rolling shutter image capture may be timed such that a majority of the scan lines of the image frame are captured during a time period associated with the second sensor capturing the second field of view of at least a portion of the scene. In some examples, the rolling shutter image capture may be timed such that a particular scan line (or set of scan lines) is captured in association with a particular portion of the second field of view. As a non-limiting example, the rolling shutter image capture may be timed such that a central portion of the scan lines (e.g. a central scan line, a central set of scan lines, etc.) may be captured in association with data captured by the second sensor in a middle portion of the second field of view.

In some examples, orientation information (e.g., the first orientation, the second orientation, etc.) may be used as an input for causing the first sensor to initiate the rolling shutter image capture of the first field of view, e.g., such that at least a first portion of the first field of view overlaps at least a second portion of the second field of view in accordance with the synchronization condition(s). In various examples, the second field of view may move relative to the first field of view during the rolling shutter image capture.

In some examples, pose information (e.g., the first pose, the second pose, etc.) may be used as an input for causing the first sensor to initiate the rolling shutter image capture of the first field of view, e.g., such that at least a first portion of the first field of view overlaps at least a second portion of the second field of view in accordance with the synchronization condition(s).

In some examples, an exposure time may be estimated for the image frame of the rolling shutter image capture. For example, the exposure time may be estimated prior to the rolling shutter image capture being performed. In some examples, the exposure time for the image frame of the rolling shutter image capture may be estimated based at least in part on exposure time data associated with a prior rolling shutter image capture. According to various examples, the estimated exposure time may be used as an input for causing the first sensor to initiate the rolling shutter image capture of the first field of view, e.g., such that at least a first portion of the first field of view overlaps at least a second portion of the second field of view in accordance with the synchronization condition(s).

According to some examples, time data associated with one or more scan lines may be used as an input for causing the first sensor to initiate the rolling shutter image capture of the first field of view, e.g., such that at least a first portion of the first field of view overlaps at least a second portion of the second field of view in accordance with the synchronization condition(s). In some examples, the first sensor may be instructed to initiate the rolling shutter image capture based at least in part on time data associated with one or more scan lines of a prior rolling shutter image capture. Additionally, or alternatively, the first sensor may be instructed to adjust an exposure time of at least one scan line of the rolling shutter image capture, e.g., based at least in part on time data associated with one or more scan lines of the rolling shutter image capture and/or time data associated with one or more scan lines of a prior rolling shutter image capture.

If, at 1008, it is determined to not initiate a rolling shutter image capture in accordance with synchronization condition(s), then the process 1000 may proceed to determining sensor orientation(s) (at 1002) and/or to determining whether to initiate a rolling shutter image capture in accordance with synchronization condition(s) (at 1008). In various examples, sensor orientation(s) may be determined periodically and/or continuously (e.g., in near real-time).

Figure 11:
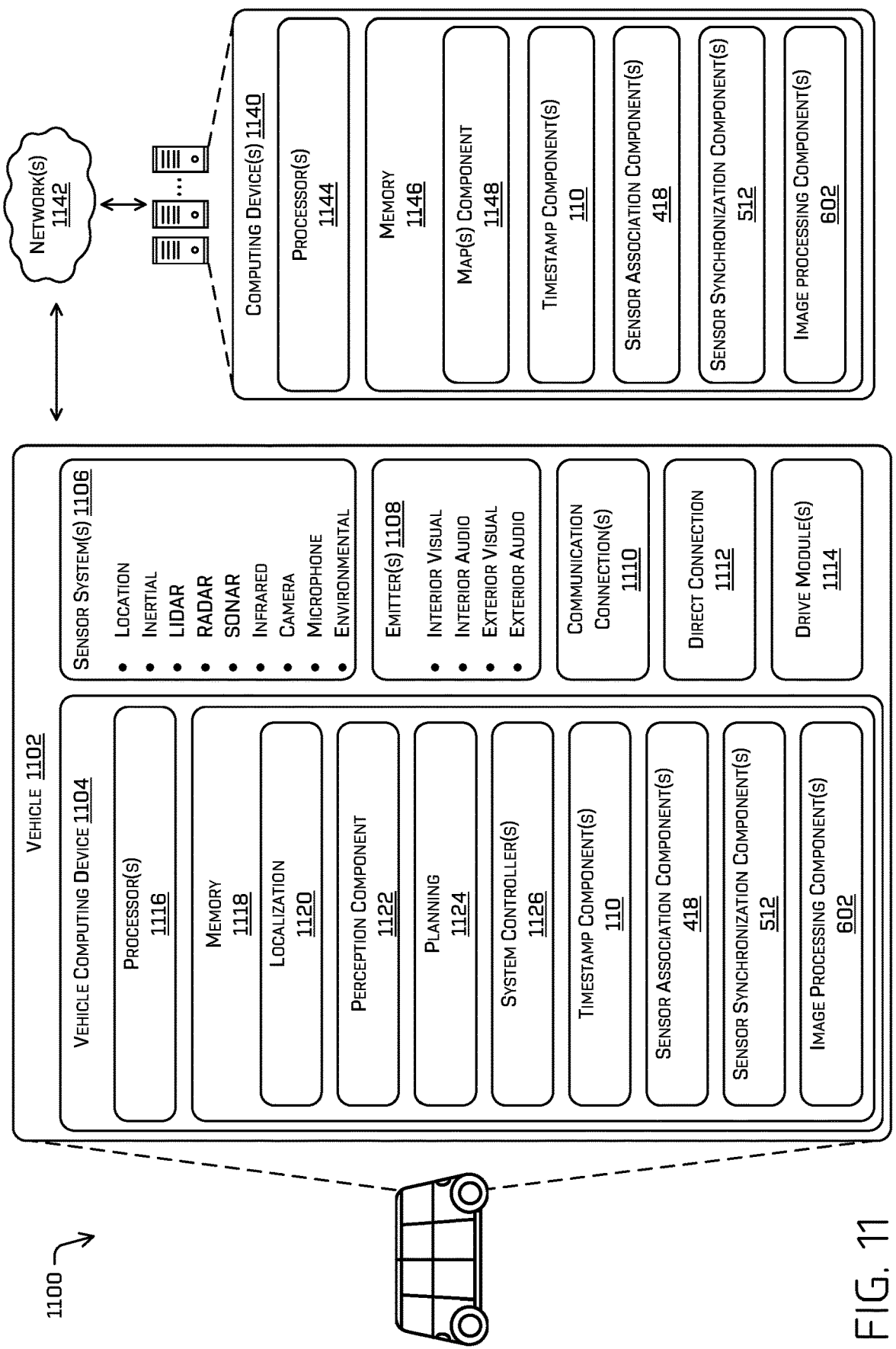
FIG. 11 is a block diagram of an example system for implementing the techniques described herein, in accordance with examples of the disclosure.

FIG. 11 is a block diagram of an example system 1100 for implementing the techniques described herein, in accordance with examples of the disclosure. In some examples, the system 1100 may include one or multiple features, components, and/or functionality of examples described herein with reference to FIGS. 1-10.

In some examples, the system 1100 may include a vehicle 1102 (e.g., the vehicle 102 described herein with reference to FIG. 1). The vehicle 1102 may include a vehicle computing device 1104, one or more sensor systems 1106, one or more emitters 1108, one or more communication connections 1110, at least one direct connection 1112, and one or more drive modules 1114.

The vehicle computing device 1104 can include one or more processors 1116 and memory 1118 communicatively coupled with the one or more processors 1116. In the illustrated example, the vehicle 1102 is an autonomous vehicle; however, the vehicle 1102 could be any other type of vehicle, or any other system having at least an image capture device (e.g., a camera enabled smartphone). In the illustrated example, the memory 1118 of the vehicle computing device 1104 stores a localization component 1120, a perception component 1122, a planning component 1124, one or more system controllers 1126, the timestamp component(s) 110, the sensor association component(s) 418, the sensor synchronization component(s) 512, and/or the image processing component(s) 602. Though depicted in FIG. 11 as residing in the memory 1118 for illustrative purposes, it is contemplated that the localization component 1120, the perception component 1122, the planning component 1124, the one or more system controllers 1126, the timestamp component(s) 110, the sensor association component(s) 418, the sensor synchronization component(s) 512, and/or the image processing component(s) 602 can additionally, or alternatively, be accessible to the vehicle 1102 (e.g., stored on, or otherwise accessible by, memory remote from the vehicle 1102). In some instances, the vehicle computing device(s) 1104 can correspond to the vehicle computing system 108 of FIG. 1.

In at least one example, the localization component 1120 can include functionality to receive data from the sensor system(s) 1106 to determine a position and/or orientation of the vehicle 1102 (e.g., one or more of an x-, y-, z-position, roll, pitch, or yaw). For example, the localization component 1120 can include and/or request/receive a map of an environment and can continuously determine a location and/or orientation of the autonomous vehicle within the map. In some instances, the localization component 1120 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 1120 can provide data to various components of the vehicle 1102 to determine an initial position of an autonomous vehicle for generating a trajectory and/or for determining to retrieve map data including an occlusion grid from memory, as discussed herein.

In some instances, the perception component 1122 can include functionality to perform object detection, segmentation, and/or classification. In some examples, the perception component 1122 can provide processed sensor data that indicates a presence of an entity that is proximate to the vehicle 1102 and/or a classification of the entity as an entity type (e.g., car, pedestrian, cyclist, animal, building, tree, road surface, curb, sidewalk, unknown, etc.). In additional and/or alternative examples, the perception component 1122 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 1124 can determine a path for the vehicle 1102 to follow to traverse through an environment. For example, the planning component 1124 can determine various routes and trajectories and various levels of detail. For example, the planning component 1124 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 1124 can generate an instruction for guiding the autonomous vehicle along at least a portion of the route from the first location to the second location. In at least one example, the planning component 1124 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 1102 to navigate.

In some examples, the planning component 1124 can use temporal logic, such as linear temporal logic and/or signal temporal logic, to evaluate one or more trajectories of the vehicle 1102. Details of utilizing temporal logic in the planning component 1124 are discussed in U.S. application Ser. No. 15/632,147, which is herein incorporated by reference, in its entirety.

In at least one example, the vehicle computing device 1104 can include one or more system controllers 1126, which can be configured to control steering, propulsion, braking, safety, emitters, communication, and other systems of the vehicle 1102. These system controller(s) 1126 can communicate with and/or control corresponding systems of the drive module(s) 1114 and/or other components of the vehicle 1102.

The memory 1118 can further include one or more maps (not shown) that can be used by the vehicle 1102 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 1102 can be controlled based at least in part on the maps. That is, the maps can be used in connection with the localization component 1120, the perception component 1122, and/or the planning component 1124 to determine a location of the vehicle 1102, identify objects in an environment, and/or generate routes and/or trajectories to navigate within an environment.

In some examples, the one or more maps can be stored on a remote computing device(s) (such as the computing device(s) 1140) accessible via network(s) 1142. In some examples, multiple maps can be stored based on, for example, a characteristic (e.g., type of entity, time of day, day of week, season of the year, etc.). Storing multiple maps can have similar memory requirements, but increase the speed at which data in a map can be accessed.

In some instances, aspects of some or all of the components discussed herein can include any models, algorithms, and/or machine learning algorithms. For example, in some instances, the components in the memory 1118 (and the memory 1146, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 1106 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1106 can include multiple instances of each of these or other types of sensors. For instance, the LIDAR sensors can include individual LIDAR sensors located at the corners, front, back, sides, and/or top of the vehicle 1102. As another example, the camera sensors can include multiple cameras disposed at various locations about the exterior and/or interior of the vehicle 1102. The sensor system(s) 1106 can provide input to the vehicle computing device 1104. Additionally or alternatively, the sensor system(s) 1106 can send sensor data, via the one or more networks 1146, to the one or more computing device(s) at a particular frequency, after a lapse of a predetermined period of time, in near real-time, etc. In some instances, the sensor system(s) 1106 can correspond to the sensor(s) 106 of FIG. 1.

The vehicle 1102 can also include one or more emitters 1108 for emitting light and/or sound, as described above. The emitters 1108 in this example include interior audio and visual emitters to communicate with passengers of the vehicle 1102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1108 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1102 can also include one or more communication connection(s) 1110 that enable communication between the vehicle 1102 and one or more other local or remote computing device(s). For instance, the communication connection(s) 1110 can facilitate communication with other local computing device(s) on the vehicle 1102 and/or the drive module(s) 1114. Also, the communication connection(s) 1110 can allow the vehicle to communicate with other nearby computing device(s) (e.g., other nearby vehicles, traffic signals, etc.). The communications connection(s) 1110 also enable the vehicle 1102 to communicate with a remote teleoperations computing device or other remote services.

The communications connection(s) 1110 can include physical and/or logical interfaces for connecting the vehicle computing device 1104 to another computing device or a network, such as network(s) 1142. For example, the communications connection(s) 1110 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 1102 can include one or more drive modules 1114. In some examples, the vehicle 1102 can have a single drive module 1114. In at least one example, if the vehicle 1102 has multiple drive modules 1114, individual drive modules 1114 can be positioned on opposite ends of the vehicle 1102 (e.g., the front and the rear, etc.). In at least one example, the drive module(s) 1114 can include one or more sensor systems to detect conditions of the drive module(s) 1114 and/or the surroundings of the vehicle 1102. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 1114. In some cases, the sensor system(s) on the drive module(s) 1114 can overlap or supplement corresponding systems of the vehicle 1102 (e.g., sensor system(s) 1106).

The drive module(s) 1114 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 1114 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 1114. Furthermore, the drive module(s) 1114 also include one or more communication connection(s) that enable communication by the respective drive module with one or more other local or remote computing device(s).

In at least one example, the direct connection 1112 can provide a physical interface to couple the one or more drive module(s) 1114 with the body of the vehicle 1102. For example, the direct connection 1112 can allow the transfer of energy, fluids, air, data, etc. between the drive module(s) 1114 and the vehicle. In some instances, the direct connection 1112 can further releasably secure the drive module(s) 1114 to the body of the vehicle 1102.

In at least one example, the components discussed herein can process sensor data, as described above, and can send their respective outputs, over the one or more network(s) 1142, to one or more computing device(s) 1140. In at least one example, the components discussed herein can send their respective outputs to the one or more computing device(s) 1140 at a particular frequency, after a lapse of a predetermined period of time, in near real-time, etc.

In some examples, the vehicle 1102 can send sensor data to one or more computing device(s) 1140 via the network(s) 1142. In some examples, the vehicle 1102 can send raw sensor data to the computing device(s) 1140. In other examples, the vehicle 1102 can send processed sensor data and/or representations of sensor data to the computing device(s) 1140. In some examples, the vehicle 1102 can send sensor data to the computing device(s) 1140 at a particular frequency, after a lapse of a predetermined period of time, in near real-time, etc. In some cases, the vehicle 1102 can send sensor data (raw or processed) to the computing device(s) 1140 as one or more log files.

The computing device(s) 1140 can include processor(s) 1144 and a memory 1146 storing a maps(s) component 1148, the timestamp component(s) 110, the sensor association component(s) 418, the sensor synchronization component(s) 512, and/or the image processing component(s) 602.

The processor(s) 1116 of the vehicle 1102 and the processor(s) 1144 of the computing device(s) 1140 can be any suitable processor capable of executing instructions to process data and perform operations as described herein. By way of example and not limitation, the processor(s) 1116 and 1144 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1118 and 1146 are examples of non-transitory computer-readable media. The memory 1118 and 1146 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 11 is illustrated as a distributed system, in alternative examples, components of the vehicle 1102 can be associated with the computing device(s) 1140 and/or components of the computing device(s) 1140 can be associated with the vehicle 1102. That is, the vehicle 1102 can perform one or more of the functions associated with the computing device(s) 1140, and vice versa. Further, aspects of the timestamp component(s) 110, the sensor association component(s) 418, the sensor synchronization component(s) 512, and/or the image processing component(s) 602 can be performed on any of the devices discussed herein.

FIGS. 7-10 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some implementations, one or more of the operations may be omitted.

EXAMPLE CLAUSES

A. A system comprising: one or more processors; and one or more non-transitory computer-readable media storing instructions executable by the one or more processors, wherein the instructions, when executed, cause the one or more processors to perform operations comprising: receiving, from an image sensor, first scan line data of an image frame associated with a rolling shutter image capture; appending first time data to the first scan line data; adjusting, based at least in part on a size of the first time data, a width associated with the first scan line data; receiving, from the image sensor, second scan line data of the image frame associated with the rolling shutter image capture; and appending second time data to the second scan line data.

B. The system as paragraph A recites, the operations further comprising: receiving, from a LIDAR sensor, LIDAR data comprising a LIDAR point, the LIDAR data associated with third time data; and associating, based at least in part on the first time data and the third time data, the LIDAR point with at least a portion of the first scan line data.

C. The system as either paragraph A or B recites, wherein: the first scan line data is associated with a first exposure time; and the second scan line data is associated with a second exposure time that is different than the first exposure time.

D. The system as any one of paragraphs A-C recites, the operations further comprising: modifying, based at least in part on the first time data, at least a portion of an image to correct or compensate for a distortion effect caused by motion associated with the rolling shutter image capture, to produce a modified image, wherein the distortion effect comprises one or more of: wobble; skew; spatial aliasing; or temporal aliasing; and controlling, based at least in part on the modified image, movement of an autonomous vehicle.

E. The system as any one of paragraphs A-D recites, further comprising: a precision time protocol (PTP) clock; and a system processor clock that is synchronized with the PTP clock; wherein the operations further comprise: obtaining data from a counter that is slaved to the system processor clock; and determining, based at least in part on the data, the first time data.

F. A method comprising: receiving first scan line data associated with a first scan line of an image frame; adding first time data to the first scan line; receiving second scan line data associated with a second scan line of the image frame; and adding second time data to the second scan line.

G. The method as paragraph F recites, wherein: the receiving the first scan line data comprises: receiving the first scan line data from a first sensor having a first sensor modality; and the method further comprises: receiving data from a second sensor having a second sensor modality, the data comprising a measurement; and determining, based at least in part on the first time data, an association between the measurement and at least a portion of the first scan line data.

H. The method as paragraph G recites, wherein: the first sensor comprises an image sensor; and the second sensor comprises at least one of: an additional image sensor; a LIDAR sensor; a radar sensor; or a time-of-flight sensor.

I. The method as either paragraph G or H recites, further comprising: associating, based at least in part on the association between the measurement and the at least a portion of the first scan line, at least part of the first scan line data with at least part of the data from the second sensor to produce associated data; and controlling, based at least in part on the associated data, movement of an autonomous vehicle.

J. The method as any one of paragraphs F-I recites, further comprising: obtaining data from a counter that is slaved to a system processor clock of an autonomous vehicle, wherein the system processor clock is synchronized with a precision time protocol (PTP) clock; and determining, based at least in part on the data, the first time data.

K. The method as paragraph J recites, wherein: the receiving the first scan line data comprises: receiving the first scan line data from a first sensor having a first sensor modality; the method further comprises: receiving other data from a second sensor having a second sensor modality, the other data comprising a measurement, wherein the measurement is associated with a timestamp based on time data from the PTP clock; and determining, based at least in part on the first time data and the timestamp associated with the measurement, an association between the measurement and at least a portion of the first scan line data.

L. The method as any one of paragraphs F-K recites, wherein: the first scan line data is associated with a first exposure time; and the second scan line data is associated with a second exposure time that is different than the first exposure time.

M. The method as any one of paragraphs F-M recites, further comprising: modifying, based at least in part on the first time data, at least a portion of an image to correct or compensate for a distortion effect caused by motion associated with a rolling shutter image capture.

N. The method as paragraph M recites, wherein the distortion effect comprises at least one of: wobble; skew; spatial aliasing; or temporal aliasing.

O. One or more non-transitory computer-readable media storing instructions executable by one or more processors, wherein the instructions, when executed, cause the one or more processors to perform operations comprising: receiving scan line data associated with a scan line of an image frame of a rolling shutter image capture; and adding time data to the scan line.

P. The one or more non-transitory computer-readable media as paragraph O recites, wherein: the scan line data associated with the scan line is first scan line data associated with a first scan line; the time data is first time data; and the operations further comprise: receiving second scan line data associated with a second scan line of the image frame of the rolling shutter image capture; and adding second time data to the second scan line.

Q. The one or more non-transitory computer-readable media as either paragraph O or P recites, wherein: the receiving the scan line data comprises: receiving the scan line data from an image sensor; and the operations further comprise: receiving measurement data from at least one of: an additional image sensor; a LIDAR sensor; a radar sensor; or a time-of-flight sensor; wherein the measurement data comprises a measurement associated with at least a portion of an environment proximate a vehicle; and determining, based at least in part on the time data, an association between the measurement and one or more pixels of the scan line data.

R. The one or more non-transitory computer-readable media as paragraph Q recites, wherein: the vehicle comprises an autonomous vehicle, the association comprises distance data, and the operations further comprise: controlling, based at least in part on the associated data, movement of the autonomous vehicle.

S. The one or more non-transitory computer-readable media as either paragraph Q or R recites, wherein: the measurement data comprises distance data associated with an object; and the operations further comprise: modifying, based at least in part on the time data and the distance data, at least a portion of an image associated with the object, to correct or compensate for a distortion effect caused by motion associated with the rolling shutter image capture.

T. The one or more non-transitory computer-readable media as any one of paragraphs O-S recites, the operations further comprising: obtaining data from a counter that is slaved to a system processor clock of an autonomous vehicle, wherein the system processor clock is synchronized with a precision time protocol (PTP) clock; and determining, based at least in part on the data, the time data.

U. A system comprising: one or more processors; and one or more non-transitory computer-readable media storing instructions executable by the one or more processors, wherein the instructions, when executed, cause the one or more processors to perform operations comprising: determining a first pose of an image sensor, wherein the image sensor is associated with a first field of view; determining a second pose of a LIDAR sensor, wherein the LIDAR sensor is associated with a second field of view; and causing the image sensor to initiate a rolling shutter image capture of the first field of view, such that at least a first portion of the first field of view overlaps at least a second portion of the second field of view in accordance with one or more synchronization conditions, wherein the rolling shutter image capture produces an image frame that comprises: a first scan line associated with a first exposure time; and a second scan line associated with a second exposure time that is different than the first exposure time.

V. The system as paragraph U recites, wherein: the image sensor is a first image sensor; the rolling shutter image capture is a first rolling shutter image capture; the one or more synchronization conditions comprise a first group of one or more synchronization conditions; and the operations further comprise: determining a pose of a second image sensor, wherein the second image sensor is associated with a field of view; and causing the second image sensor to initiate a second rolling shutter image capture of the field of view, such that at least a portion of the field of view associated with the second image sensor overlaps at least a portion of the second field of view associated with the LIDAR sensor in accordance with a second group of one or more synchronization conditions.

W. The system as either paragraph U or V recites, wherein the one or more synchronization conditions comprise at least one of: a first central portion of the image frame being substantially aligned with a second central portion of the second field of view associated with the LIDAR sensor; or a majority of scan lines of the image frame being captured during a time period associated with the second field of view.

X. The system as any one of paragraphs U-W recites, the operations further comprising: receiving, from the image sensor and during a time period before the rolling shutter image capture, scan line data associated with a scan line of a prior rolling shutter image capture; and appending time data to the scan line data; wherein the causing the image sensor to initiate the rolling shutter image capture is based at least in part on the time data.

Y. A method comprising: determining an orientation of a first field of view associated with a first sensor with respect to a second field of view associated with a second sensor; and causing the first sensor to initiate a rolling shutter image capture of the first field of view, such that at least a portion of the first field of view overlaps at least a second portion of the second field of view in accordance with one or more synchronization conditions, wherein the rolling shutter image capture produces an image frame that comprises: a first scan line associated with a first exposure time; and a second scan line associated with a second exposure time that is different than the first exposure time.

Z. The method as paragraph Y recites, wherein: the first sensor comprises an image sensor of an autonomous vehicle; and the second sensor comprises a LIDAR sensor of the autonomous vehicle.

AA. The method as either paragraph Y or Z recites, further comprising: determining a first pose of the first sensor, wherein the first pose includes: a first position; and a first orientation; and determining a second pose of the second sensor, wherein the second pose includes: a second position; and a second orientation; wherein the causing the first sensor to initiate the rolling shutter image capture is based at least in part on the first pose and the second pose.

BB. The method as any one of paragraphs Y-AA recites, wherein: the first sensor comprises a first image sensor; the orientation is a first orientation; the rolling shutter image capture is a first rolling shutter image capture; the second sensor comprises a LIDAR sensor; the one or more synchronization conditions comprise a first set of one or more synchronization conditions; and the method further comprises: determining a second orientation of a second image sensor associated with a field of view with respect to the LIDAR sensor; and causing, based at least in part on the second orientation, the second image sensor to initiate a second rolling shutter image capture of the field of view, such that at least a portion of the field of view overlaps at least a portion of the second field of view associated with the LIDAR sensor in accordance with a second set of one or more synchronization conditions.

CC. The method as any one of paragraphs Y-BB recites, wherein the one or more synchronization conditions comprise at least one of: a first central portion of the image frame being substantially aligned with a second central portion of the second field of view associated with the second sensor; or a majority of scan lines of the image frame being captured during a time period associated with the second field of view.

DD. The method as any one of paragraphs Y-CC recites, further comprising: estimating an exposure time for the image frame; wherein the causing the first sensor to initiate the rolling shutter image capture is based at least in part on the exposure time.

EE. The method as paragraph DD recites, further comprising: receiving, from the first sensor and during a time period before the rolling shutter image capture, exposure time data associated with a prior rolling shutter image capture; wherein the estimating the exposure time for the image frame is based at least in part on the exposure time data associated with the prior rolling shutter image capture.

FF. The method as any one of paragraphs Y-EE recites, further comprising: determining, based at least in part on first time data from a system processor clock that is synchronized with a precision time protocol (PTP) clock, a first timestamp associated with a scan line of the image frame; wherein the causing the first sensor to initiate the rolling shutter image capture is based at least in part on the first timestamp.

GG. The method as paragraph FF recites, further comprising: determining, based at least in part on second time data from the PTP clock, a second timestamp associated with a measurement captured by the second sensor; wherein the causing the first sensor to initiate the rolling shutter image capture is based at least in part on the second timestamp.

HH. The method as any one of paragraphs Y-GG recites, wherein: the first sensor comprises an image sensor; the image frame includes a scan line within a first central portion of the image frame; the second sensor comprises a LIDAR sensor; and the causing the first sensor to initiate the rolling shutter image capture comprises: causing the image sensor to initiate the rolling shutter image capture, such that the scan line is captured during a time period associated with a second central portion of the second field of view associated with the LIDAR sensor.

II. The method as any one of paragraphs Y-HH recites, wherein the second field of view moves relative to the first field of view during the rolling shutter image capture.

JJ. One or more non-transitory computer-readable media storing instructions executable by one or more processors, wherein the instructions, when executed, cause the one or more processors to perform operations comprising: determining an orientation of a first field of view associated with a first sensor with respect to a second field of view associated with a second sensor; and causing the image sensor to initiate a rolling shutter image capture of the first field of view, such that at least a first portion of the first field of view overlaps at least a second portion of the second field of view in accordance with one or more synchronization conditions, wherein the rolling shutter image capture produces an image frame that comprises: a first scan line associated with a first exposure time; and a second scan line associated with a second exposure time that is different than the first exposure time.

KK. The one or more non-transitory computer-readable media as paragraph JJ recites, wherein the one or more synchronization conditions comprise at least one of: a first central portion of the image frame being substantially aligned with a second central portion of the second field of view associated with the second sensor; or a majority of scan lines of the image frame being captured during a time period associated with the second field of view.

LL. The one or more non-transitory computer-readable media as either paragraph JJ or KK recites, the operations further comprising: receiving, from the first sensor and during a time period before the rolling shutter image capture, first exposure time data associated with a first scan line of a prior image frame associated with a prior rolling shutter image capture; receiving, from the first sensor and during the time period before the rolling shutter image capture, second exposure time data associated with a last scan line of the prior image frame; determining, based at least in part on the first exposure time data and the second exposure time data, an exposure time for the image frame of the rolling shutter image capture; wherein the causing the image sensor to initiate the rolling shutter image capture is based at least in part on the exposure time.

MM. The one or more non-transitory computer-readable media as any one of paragraphs JJ-LL recites, the operations further comprising: determining, based at least in part on first time data from a system processor clock that is synchronized with a precision time protocol (PTP) clock, a first timestamp associated with a scan line of the image frame; wherein the causing the first sensor to initiate the rolling shutter image capture is based at least in part on the first timestamp.

NN. The one or more non-transitory computer-readable media as paragraph MM recites, the operations further comprising: determining, based at least in part on second time data from the PTP clock, a second timestamp associated with a measurement captured by the second sensor; wherein the causing the first sensor to initiate the rolling shutter image capture is based at least in part on the second timestamp.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the one or more processors to perform operations comprising:
determining a first pose of an image sensor, wherein the image sensor is associated with a first field of view;
determining a second pose of a LIDAR sensor, wherein the LIDAR sensor is associated with a second field of view; and
causing the image sensor to initiate a rolling shutter image capture of the first field of view, such that at least a first portion of the first field of view overlaps at least a second portion of the second field of view in accordance with one or more synchronization conditions, wherein the rolling shutter image capture produces an image frame that comprises:
a first scan line associated with a first exposure time; and
a second scan line associated with a second exposure time that is different than the first exposure time.

2. The system of claim 1, wherein:
the image sensor is a first image sensor;
the rolling shutter image capture is a first rolling shutter image capture;
the one or more synchronization conditions comprise a first group of one or more synchronization conditions; and
the operations further comprise:
determining a pose of a second image sensor, wherein the second image sensor is associated with a field of view; and
causing the second image sensor to initiate a second rolling shutter image capture of the field of view, such that at least a portion of the field of view associated with the second image sensor overlaps at least a portion of the second field of view associated with the LIDAR sensor in accordance with a second group of one or more synchronization conditions.

3. The system of claim 1, wherein the one or more synchronization conditions comprise at least one of:
a first central portion of the image frame being substantially aligned with a second central portion of the second field of view associated with the LIDAR sensor; or
a majority of scan lines of the image frame being captured during a time period associated with the second field of view.

4. The system of claim 1, the operations further comprising:
receiving, from the image sensor and during a time period before the rolling shutter image capture, scan line data associated with a scan line of a prior rolling shutter image capture; and
appending time data to the scan line data;
wherein the causing the image sensor to initiate the rolling shutter image capture is based at least in part on the time data.

5. A method comprising:
determining an orientation of a first field of view associated with a first sensor with respect to a second field of view associated with a second sensor; and
causing the first sensor to initiate a rolling shutter image capture of the first field of view, such that at least a portion of the first field of view overlaps at least a second portion of the second field of view in accordance with one or more synchronization conditions, wherein the rolling shutter image capture produces an image frame that comprises:
a first scan line associated with a first exposure time; and
a second scan line associated with a second exposure time that is different than the first exposure time.

6. The method of claim 5, wherein:
the first sensor comprises an image sensor of an autonomous vehicle; and
the second sensor comprises a LIDAR sensor of the autonomous vehicle.

7. The method of claim 5, further comprising:
determining a first pose of the first sensor, wherein the first pose includes:
a first position; and
a first orientation; and
determining a second pose of the second sensor, wherein the second pose includes:
a second position; and
a second orientation;
wherein the causing the first sensor to initiate the rolling shutter image capture is based at least in part on the first pose and the second pose.

8. The method of claim 5, wherein:
the first sensor comprises a first image sensor;
the orientation is a first orientation;
the rolling shutter image capture is a first rolling shutter image capture;
the second sensor comprises a LIDAR sensor;
the one or more synchronization conditions comprise a first set of one or more synchronization conditions; and
the method further comprises:
determining a second orientation of a second image sensor associated with a field of view with respect to the LIDAR sensor; and
causing, based at least in part on the second orientation, the second image sensor to initiate a second rolling shutter image capture of the field of view, such that at least a portion of the field of view overlaps at least a portion of the second field of view associated with the LIDAR sensor in accordance with a second set of one or more synchronization conditions.

9. The method of claim 5, wherein the one or more synchronization conditions comprise at least one of:
a first central portion of the image frame being substantially aligned with a second central portion of the second field of view associated with the second sensor; or
a majority of scan lines of the image frame being captured during a time period associated with the second field of view.

10. The method of claim 5, further comprising:
estimating an exposure time for the image frame;
wherein the causing the first sensor to initiate the rolling shutter image capture is based at least in part on the exposure time.

11. The method of claim 10, further comprising:
receiving, from the first sensor and during a time period before the rolling shutter image capture, exposure time data associated with a prior rolling shutter image capture;
wherein the estimating the exposure time for the image frame is based at least in part on the exposure time data associated with the prior rolling shutter image capture.

12. The method of claim 5, further comprising:
determining, based at least in part on first time data from a system processor clock that is synchronized with a precision time protocol (PTP) clock, a first timestamp associated with a scan line of the image frame;
wherein the causing the first sensor to initiate the rolling shutter image capture is based at least in part on the first timestamp.

13. The method of claim 12, further comprising:
determining, based at least in part on second time data from the PTP clock, a second timestamp associated with a measurement captured by the second sensor;
wherein the causing the first sensor to initiate the rolling shutter image capture is based at least in part on the second timestamp.

14. The method of claim 5, wherein:
the first sensor comprises an image sensor;
the image frame includes a scan line within a first central portion of the image frame;
the second sensor comprises a LIDAR sensor; and
the causing the first sensor to initiate the rolling shutter image capture comprises:
causing the image sensor to initiate the rolling shutter image capture, such that the scan line is captured during a time period associated with a second central portion of the second field of view associated with the LIDAR sensor.

15. The method of claim 5, wherein the second field of view moves relative to the first field of view during the rolling shutter image capture.

16. One or more non-transitory computer-readable media storing instructions executable by one or more processors, wherein the instructions, when executed, cause the one or more processors to perform operations comprising:
determining an orientation of a first field of view associated with a first sensor with respect to a second field of view associated with a second sensor; and
causing the image sensor to initiate a rolling shutter image capture of the first field of view, such that at least a first portion of the first field of view overlaps at least a second portion of the second field of view in accordance with one or more synchronization conditions, wherein the rolling shutter image capture produces an image frame that comprises:
a first scan line associated with a first exposure time; and
a second scan line associated with a second exposure time that is different than the first exposure time.

17. The one or more non-transitory computer-readable media of claim 16, wherein the one or more synchronization conditions comprise at least one of:
  a first central portion of the image frame being substantially aligned with a second central portion of the second field of view associated with the second sensor; or
  a majority of scan lines of the image frame being captured during a time period associated with the second field of view.

18. The one or more non-transitory computer-readable media of claim 16, the operations further comprising:
  receiving, from the first sensor and during a time period before the rolling shutter image capture, first exposure time data associated with a first scan line of a prior image frame associated with a prior rolling shutter image capture;
  receiving, from the first sensor and during the time period before the rolling shutter image capture, second exposure time data associated with a last scan line of the prior image frame;
  determining, based at least in part on the first exposure time data and the second exposure time data, an exposure time for the image frame of the rolling shutter image capture;
  wherein the causing the image sensor to initiate the rolling shutter image capture is based at least in part on the exposure time.

19. The one or more non-transitory computer-readable media of claim 16, the operations further comprising:
  determining, based at least in part on first time data from a system processor clock that is synchronized with a precision time protocol (PTP) clock, a first timestamp associated with a scan line of the image frame;
  wherein the causing the first sensor to initiate the rolling shutter image capture is based at least in part on the first timestamp.

20. The one or more non-transitory computer-readable media of claim 19, the operations further comprising:
  determining, based at least in part on second time data from the PTP clock, a second timestamp associated with a measurement captured by the second sensor;
  wherein the causing the first sensor to initiate the rolling shutter image capture is based at least in part on the second timestamp.

* * * * *